(12) United States Patent
Myer et al.

(10) Patent No.: US 6,574,234 B1
(45) Date of Patent: Jun. 3, 2003

(54) METHOD AND APPARATUS FOR CONTROLLING NETWORK DEVICES

(75) Inventors: Aaron Myer, Draper, UT (US); W. Eric Smith, Lindon, UT (US)

(73) Assignee: AMX Corporation, Richardson, TX (US)

( * ) Notice: Subject to any disclaimer, the term of this patent is extended or adjusted under 35 U.S.C. 154(b) by 0 days.

(21) Appl. No.: 08/924,233

(22) Filed: Sep. 5, 1997

(51) Int. Cl.[7] .................................................. H04J 3/02
(52) U.S. Cl. ........................................ 370/462; 370/438
(58) Field of Search ................................. 370/362, 364, 370/438, 463, 462; 709/223, 224, 2

(56) References Cited

U.S. PATENT DOCUMENTS

| | | | |
|---|---|---|---|
| 3,597,743 A | | 8/1971 | Murphy et al. |
| 4,024,505 A | | 5/1977 | Sperling |
| 4,530,069 A | | 7/1985 | Desrochers |
| 4,953,194 A | * | 8/1990 | Hansen et al. ................ 379/25 |
| 5,014,193 A | | 5/1991 | Garner et al. |
| 5,056,001 A | | 10/1991 | Sexton |
| 5,072,374 A | * | 12/1991 | Sexton et al. ................ 395/800 |
| 5,086,385 A | | 2/1992 | Launey et al. |
| 5,103,391 A | | 4/1992 | Barrett |
| 5,233,510 A | | 8/1993 | Brueckner et al. |
| 5,276,630 A | | 1/1994 | Baldwin et al. |
| 5,311,451 A | | 5/1994 | Barrett |
| 5,371,859 A | | 12/1994 | Lennartsson |
| 5,434,982 A | | 7/1995 | Calzi |
| 5,481,750 A | * | 1/1996 | Parise et al. ................ 395/800 |
| 5,500,794 A | | 3/1996 | Fujita et al. |
| 5,510,975 A | | 4/1996 | Ziegler, Jr. |
| 5,528,215 A | | 6/1996 | Siu et al. |
| 5,537,663 A | | 7/1996 | Belmont et al. |
| 5,565,855 A | | 10/1996 | Knibbe |
| 5,699,532 A | * | 12/1997 | Barrett et al. ................ 395/309 |
| 5,710,755 A | * | 1/1998 | Chen ............................ 370/24 |
| 5,848,054 A | * | 12/1998 | Mosebrook et al. ........ 370/226 |

* cited by examiner

*Primary Examiner*—Huy D. Vu
*Assistant Examiner*—Alexander Boakye
(74) *Attorney, Agent, or Firm*—Gardere Wynne Sewell

(57) ABSTRACT

A method and apparatus for controlling devices on a network, such as household devices on a home automation network is presented. The present invention provides an extended addressing option and an extended packet size option. The present invention further provides packet order control, partial packet support, and multiple bit priority control. The present invention also provides a central controller that avoids the maintenance requirements of a distributed control system. The central controller may be coupled to a computer, allowing the computer to program the central controller and to act as a redundant controller in case the central controller fails or is otherwise unable to effectively control the network. The central controller may communicate with devices and other equipment over a variety of types of networks, including EIA-485 balanced cabling and ethernet networks, as well as other types of networks. The invention provides an automatic wiring testing feature that gives an indication if a node is properly wired to the controller. The invention further provides an identification mode that allows identification of devices and binding of physical devices to their corresponding representations used by the controller.

55 Claims, 12 Drawing Sheets

METHOD AND APPARATUS FOR CONTROLLING NETWORK DEVICES

BACKGROUND OF THE INVENTION

1. Field of the Invention

The present invention relates to a method and apparatus for controlling devices on a network, such as a home automation network.

2. Background Art

A modern home includes many appliances and devices intended to provide comfort and convenience to the residents. For example, a home may include lighting equipment; security equipment; entertainment equipment; and heating, ventilation, and cooling (HVAC) equipment. However, most of this equipment has been developed separately and has separate and incompatible user interfaces and controls. To set the equipment to the user's desired settings, users must learn to use many different types of controls and may have to move back and forth between controls located at different locations throughout the house to achieve the desired result. A system is needed to provide a common interface to control a wide variety of equipment from one or more convenient locations.

There are many examples of inconveniences caused by separate and incompatible user interfaces. For example, each lamp usually has its own separate switch that must be operated to control the lamp. A television set may be equipped with a remote control, but that remote control might not be compatible with a remote control for a videocassette recorder. A sound system might require different remote controls for an amplifier and a compact disc player. A thermostat may be mounted at a single fixed location and require going to that location whenever an adjustment is desired. Thus, much effort is required to control devices having separate and incompatible user interfaces.

Various attempts have been made to overcome such inconveniences. For example, so-called universal infrared remote controls were developed to allow control of multiple audio-visual devices using a single infrared-emitting control. However, such a remote control does not control lights; heating, ventilation, and air conditioning equipment (HVAC), telephone lines, relay-controlled devices, devices with electrical serial data ports, or other devices. Moreover, such a remote control is not responsive to input from other devices, for example, devices emitting infrared signals. Also, an optical path must exist between such a remote control and an audio-visual device to be controlled since the infrared signal cannot penetrate walls or floors. Thus, infrared remote controls are ineffective for home automation.

Another attempted solution is referred to as the X-10 system. The X-10 system is a power line carrier communication system that superimposes a higher-frequency (i.e., 120 KHz) amplitude shift keyed (ASK) carrier over the 60 Hz power line frequency. X-10 devices are plugged into electrical outlets within a building. Sixteen X-10 commands are available to control X-10 devices. However, most X-10 devices recognize a subset of seven commands. X-10 devices are addressable using a four-bit "house" code designated by the letters A–P and a four-bit "unit" code designated by the numbers 1–16.

Since the X-10 system relies on a power line carrier, the performance of an X-10 system may be degraded by power line noise. Since pre-existing wiring in buildings was generally not specifically intended to be used with an X-10 system, the wiring topology of a building is often unknown, especially for older structures. Attenuation of power line carrier signals on a power line network is variable and often unpredictable, affecting the reliability of power line carrier transmission. Other power line carrier transmission techniques may interfere with X-10 signals. Because of the limited carrier frequency, the data transmission rates are slow, limiting use to situations where response time is not critical and where high data throughput is not important. At least one transmitter and a separate receiver for each controlled circuit are needed. Some X-10 devices have problems with data collisions during simultaneous transmissions. Thus, the X-10 system is of limited utility for home automation.

One type of system for providing control over network devices is known as the CEBus system. The CEBus system requires a network having distributed processing capability (i.e., an intelligent network). One of the problems associated with intelligent networks is that they are difficult to update with new information or configurations since intelligent nodes across the network must be updated, usually simultaneously. Updated information cannot simply be loaded into a single controller that controls the entire network. Each node of an intelligent network must be programmed to anticipate all possible combinations of node interaction within the network. Thus, if a new type of device for which the intelligent nodes are not programmed is introduced into the network, the intelligent nodes must be reprogrammed to be able to accommodate the new type of device as well as its range of possible interactions with other nodes on the network. Thus, networks having distributed processing capability generally require more maintenance and are more difficult to set up than master-slave based networks.

Another type of system for providing control over network devices is known as the Echelon LonWorks system. The Echelon system uses nodes that may operate in either a peer-to-peer mode (providing distributed control) or a master-slave mode (utilizing centralized control). Since the nodes possess computational capabilities, processing functions may be distributed throughout the system. Although the Echelon system may use existing electric power distribution wiring for communications, separate wiring is usually installed specifically to allow the Echelon nodes to communicate. When used in the peer-to-peer mode, the Echelon system also suffers the disadvantages associated with networks having distributed processing capabilities. Unfortunately, the peer-to-peer mode has been specified for use when interoperability of Echelon devices is desired. Some of the problems that can occur with the peer-to-peer mode include difficult setup, an increased processing power requirement at each node, and incompatibility of devices with future devices.

SUMMARY OF THE INVENTION

The present invention provides a method and apparatus for controlling devices on a network, such as household devices on a home automation network. The present invention provides interconnectivity over a wide variety of different types of networks. The present invention also provides a central controller that avoids the maintenance requirements of a distributed control system. The present invention further provides for the use of multiple redundant controllers. The present invention provides an extended addressing option and an extended packet size option. The present invention further provides an identification mode, packet order control, partial packet support, and multiple bit priority control.

The present invention provides a home automation network utilizing a central controller that provides control over one or more devices connected to the network. The central controller may be coupled to a computer, allowing the computer to program the central controller and to act as a redundant controller in case the central controller fails or is otherwise unable to effectively control the network. The central controller may communicate with devices and other equipment over a variety of types of networks, including EIA-485 balanced cabling and ethernet networks, as well as other types of networks. Communication over an almost unlimited number of different types of networks is possible with a computer attached to the central controller.

The invention provides an automatic wiring testing feature that gives an indication if a node is properly wired to the controller. The proper wiring indication may be used by installers and users to verify correct installation and to diagnose wiring faults.

The invention further provides an identification mode that allows identification of devices and binding of physical devices to their corresponding representations used by the controller. The actual physical devices are referred to as hardware objects, while the representations used by the controller to represent the hardware objects are referred to as software objects. When a software object is being defined or selected, any hardware objects that are not already bound to a software object may be placed in an identification mode. In the identification mode, the unbound hardware objects provide an indication that they are unbound. A hardware object to be bound to the software object can then be easily selected from the unbound hardware objects.

For example, in one embodiment of the invention, devices equipped with a visual indicator, such as a light emitting diode (LED) or liquid crystal display (LCD) may be configured to flash the LED or LCD to indicate that the hardware object is unbound. Devices with a display, such as a LCD, may be configured to display the current software object that is to be bound to a hardware object. When the hardware object to which the software object is to be bound is identified, the hardware object may be selected, for example by pushing a button or taking some other action to cause a signal to be transmitted from the selected hardware object to the controller over the network.

DETAILED DESCRIPTION OF THE INVENTION

A method and apparatus for providing a home automation system is described. In the following description, numerous specific details are set forth in order to provide a more thorough understanding of the present invention. It will be apparent, however, to one skilled in the art, that the present invention may be practiced without these specific details. In other instances, well-known features have not been described in detail in order not to unnecessarily obscure the present invention.

In the past, it has been difficult to control diverse devices distributed throughout a structure, such as a home. Most typical devices are not provided with means to interconnect them with other devices to form a network. Even devices that have traditionally been connected together in one manner (e.g., audio and video equipment connected to pass audio and video signals) are generally not connected to pass control signals between the devices. Existing networks typically require complicated configuration procedures and are generally incompatible with other common types of networks. Thus, a system is needed that can control a wide variety of incompatible devices located at several locations without the need for complicated configuration procedures.

One embodiment of the present invention provides a network suitable for home automation that uses a central controller that provides for easy configuration of the network and management of devices connected to the network. The system is compatible with a wide variety of networking standards and can be used with multiple types of networks simultaneously.

The invention also provides for easy identification of devices attached to the network and easy association of hardware objects with their corresponding software objects. Thus, configuration of networks is greatly simplified.

Figure 1:
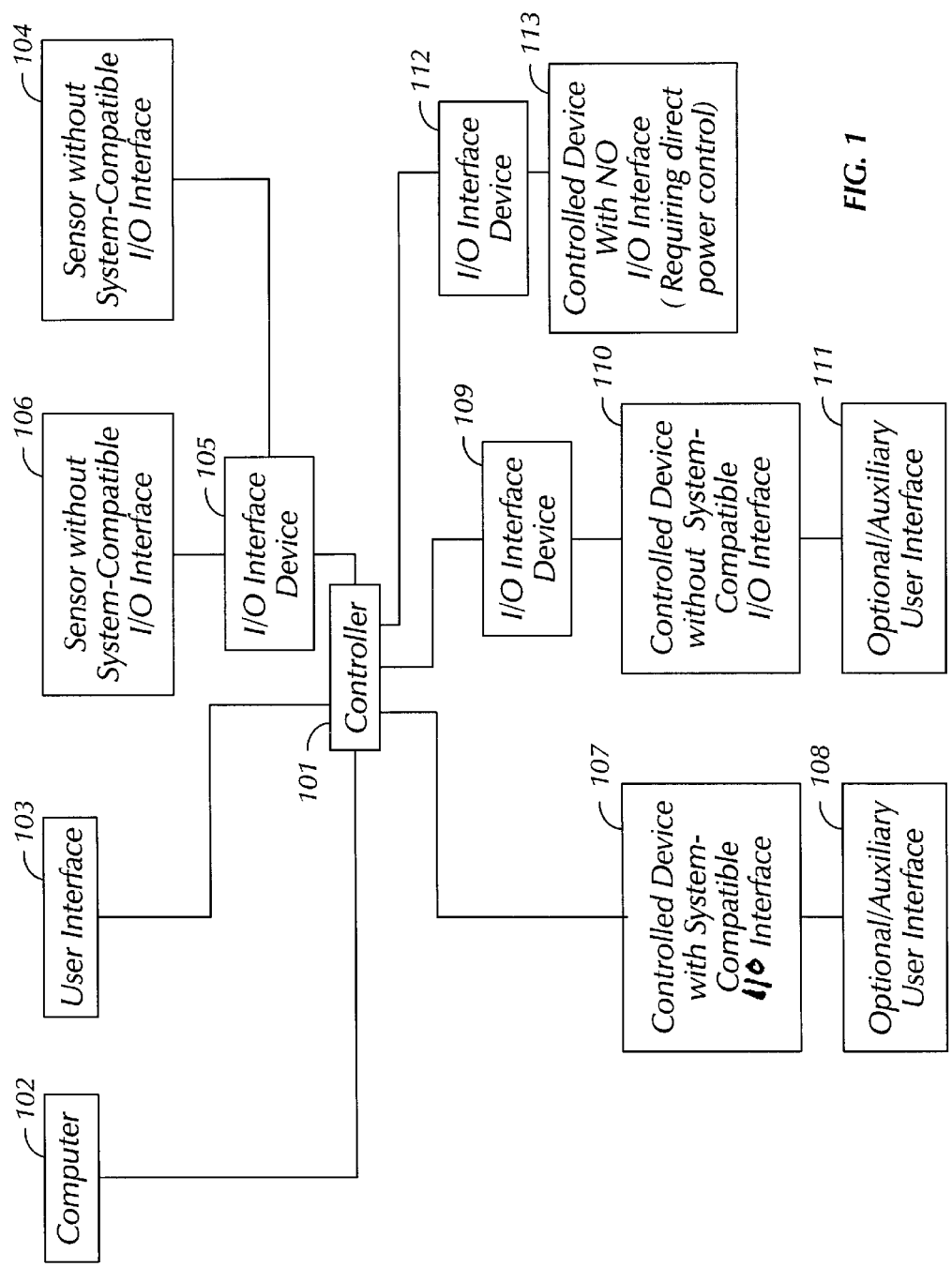
FIG. 1 is a block diagram illustrating a system that may be used with one embodiment of the present invention.

FIG. 1 is a block diagram illustrating a system that may be used with one embodiment of the present invention. Controller 101 is coupled to computer 102, user interface 103, sensor with system-compatible input/output (I/O) interface 104, I/O interface device 105, controlled device with system-compatible I/O interface 107, I/O interface device 109, and I/O interface device 112. I/O interface device 105 is coupled to sensor without system-compatible I/O interface 106. I/O interface device 109 is coupled to controlled device without system-compatible I/O interface 110. Controlled device without system-compatible I/O interface 110 is coupled to optional/auxiliary user interface 111. I/O interface device 112 is coupled to controlled device utilizing direct power control 113.

Controller 101 controls devices to which it is coupled and provides processing capability for the system, either independent of or in conjunction with computer 102. Computer 102 is used to configure controller 101 and can be used to control devices coupled to controller 101 even if controller 101 is only partially operational. Controller 101 can control the devices even if computer 102 were to fail entirely. User interface 103 allows user interaction with controller 101. Information may be passed from user interface 103 to controller 101 or from controller 101 to user interface 103.

Controller 101 can obtain information, for example environmental information or information about the status of a household item, directly from sensor with system-compatible I/O interface 104 or, through I/O interface device 105, from sensor without system-compatible I/O interface 106. Controller 101 can also send information to these sensors to control their operation or to verify communication with them.

Controller 101 can provide control of controlled device with system-compatible I/O interface 107 directly. Controlled device with system-compatible I/O interface 107 may optionally be equipped with optional/auxiliary user interface 108. Controller 101 can provide control of controlled device without system-compatible I/O interface 110 through I/O interface device 109. Controlled device without system-compatible I/O interface 110 may optionally be equipped with optional/auxiliary user interface 111. Controller 101 can provide control of controlled device utilizing direct power control 113 through I/O interface device 112.

Figure 2A:
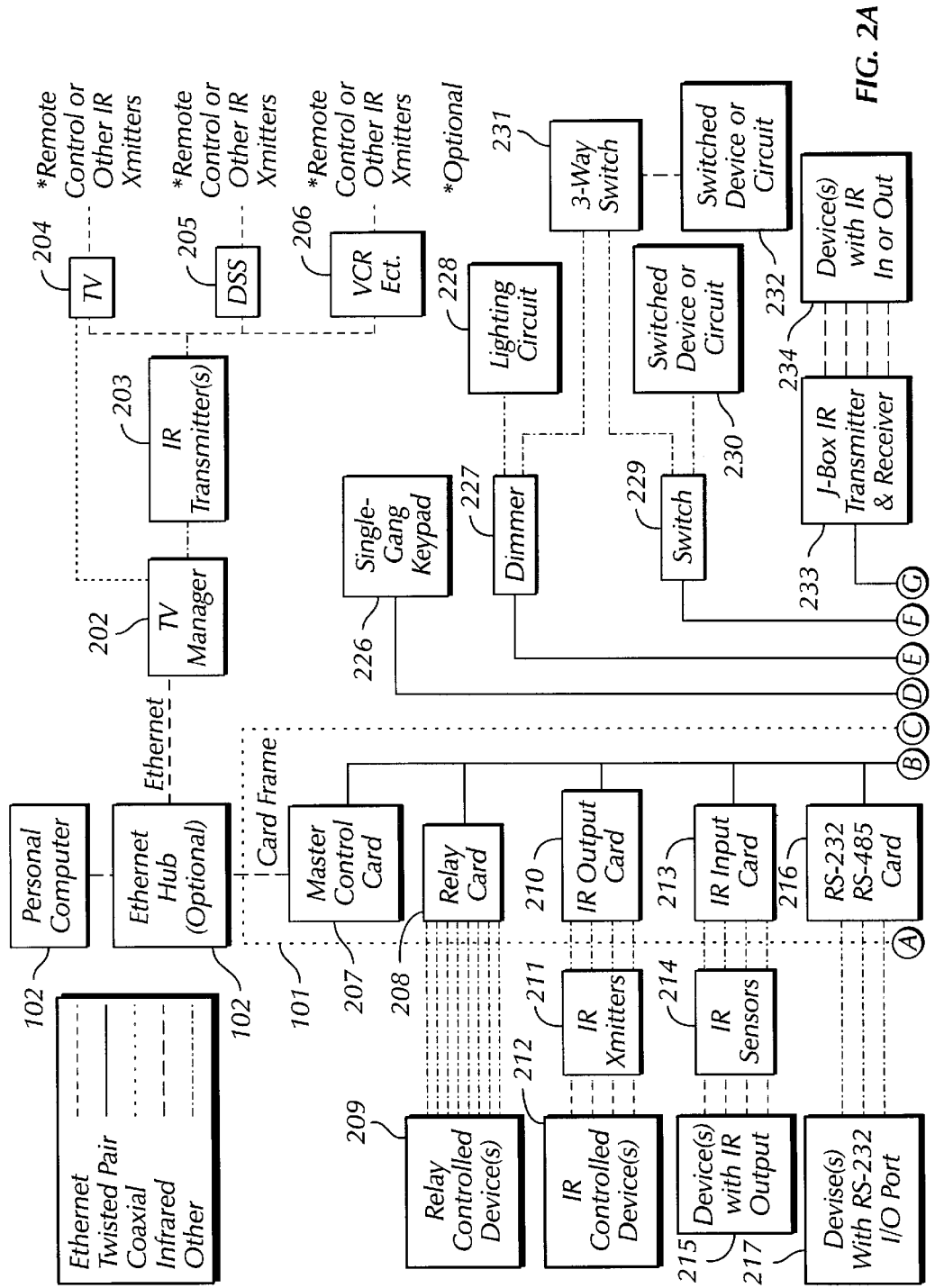
FIG. 2 is a block diagram illustrating a system that may be used with one embodiment of the present invention.
Figure 2B:
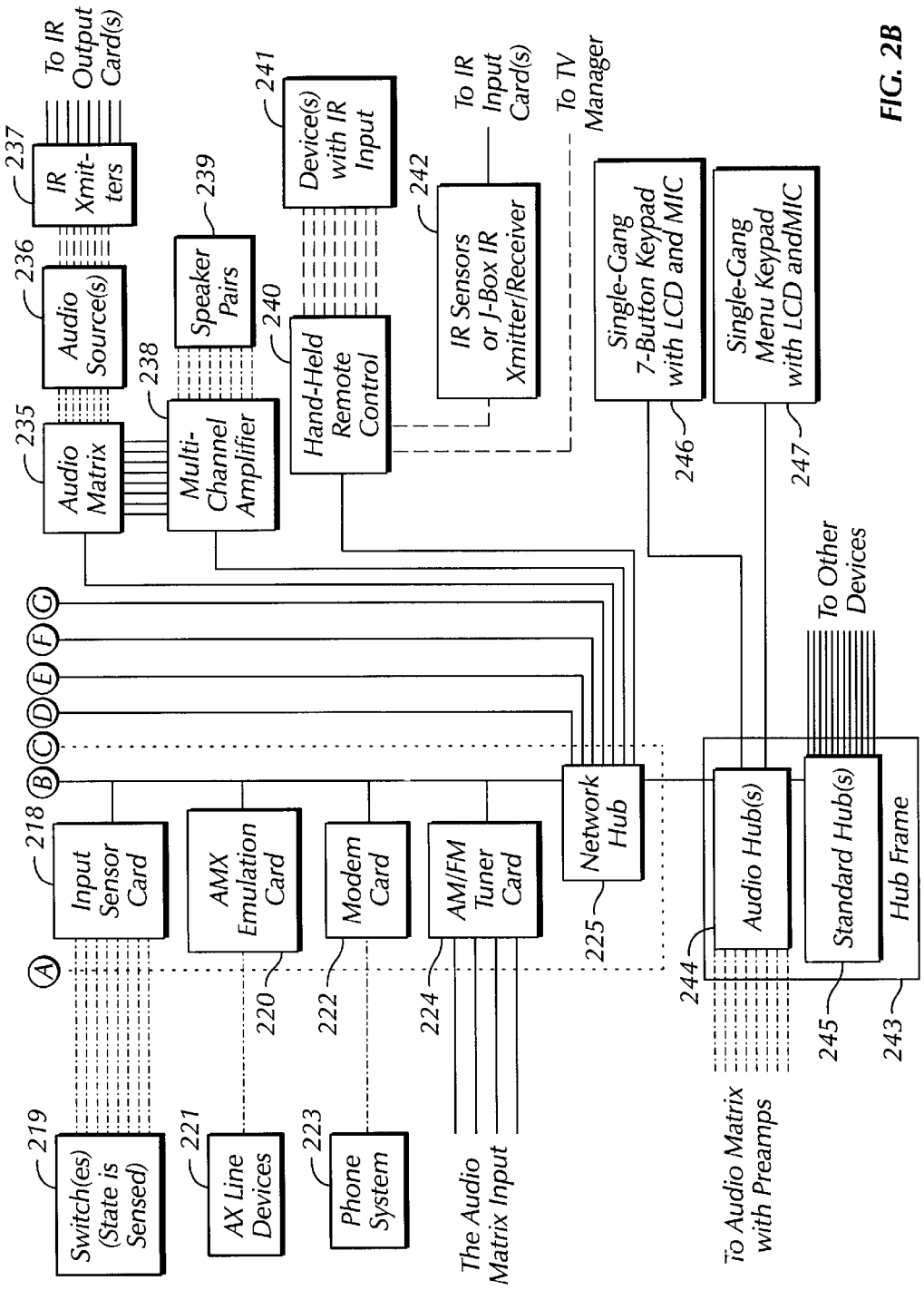

FIG. 2 is a block diagram illustrating a system that may be used with one embodiment of the present invention. The system comprises controller 101, computer 102, optional network hub 201, television (TV) manager 202, infrared (IR) transmitters 203, TV 204, DSS satellite receiver 205, videocassette recorder (VCR) 206, relay-controlled devices 209, IR transmitters 211, IR-controlled devices 212, IR sensors 214, devices with IR outputs 215, RS-232/RS-485 serial interface card 216, devices with RS-232 I/O ports 217, switches 219, AXLink devices 221, phone system 223, single gang keypad 226, dimmer 227, lighting circuit 228, switch 229, switched device or circuit 230, 3-way switch 231, switched device or circuit 232, junction box (j-box) IR transmitter and receiver 233, devices with IR input and output 234, audio matrix 235, audio sources 236, IR transmitters 237, multi-channel amplifier 238, speakers 239, remote control 240, devices with IR input 241, IR sensors or j-box IR transceiver 242, auxiliary hub 243, single-gang keypad with LCD and microphone 246, and single gang menu keypad with LCD and microphone 247.

Computer 102 is coupled to optional ethernet hub 201, or alternatively to controller 101. Ethernet hub 201 is coupled to TV manager 202. TV manager 202 is coupled to IR transmitter 203. IR transmitter 203 is coupled to TV 204, DSS satellite receiver 205, and VCR 206, each of which have IR receivers and may optionally be controlled by remote controls or other IR transmitters, for example, hand-held IR remote controls.

Controller 101 comprises a card frame (not shown), master control card 207, relay card 208, IR output card 210, IR input card 213, RS-232/RS-485 serial interface card 216, input sensor card 218, AMX emulation card 220, modem card 222, AM/FM tuner card 224, and network hub 225, all coupled to a common bus. Relay card 208 is coupled to relay-controlled devices 209. IR output card 210 is coupled to IR transmitters 211, which are coupled to IR-controlled devices 212. IR input card 213 is coupled to IR sensors 214, which are coupled to devices with IR output 215. RS-232/RS-485 card 216 is coupled to device with RS-232 I/O port 217. Input sensor card 218 is coupled to and receives input from switches 219. AMX emulation card 220 is coupled to AXLink devices 221. Modem card 222 is coupled to telephone system 223. AM/FM tuner card 224 provides signal outputs that may be coupled to inputs of audio matrix 235. Network hub 225 provides network connections for a plurality of devices that may be located throughout a building or multiple buildings.

In this embodiment, network hub 225 is coupled to single-gang keypad 226, dimmer 227, switch 229, j-box IR transmitter and receiver 233, audio matrix 235, multi-channel amplifier 238, remote control 240, and auxiliary hub 243. Dimmer 227 is coupled to lighting circuit 228 and 3-way switch 231. Switch 229 is coupled to switched device or circuit 230 and 3-way switch 231. Switched device or circuit 232 is coupled to 3-way switch 231.

J-box IR transmitter and receiver 233 is coupled to devices with IR input and output 234. Audio matrix 235 is coupled to and receives audio signals from audio sources 236. Audio sources 236 are coupled to and receive signals from IR transmitters 237. IR transmitters 237 are coupled to and receive signals from IR output card 210. Multi-channel amplifier 238 is coupled to and receives audio signals from audio matrix 235. Speakers 239 are coupled to and receive audio signals from multi-channel amplifier 238. Remote control 240 is coupled to and provides IR output to devices with IR input 241. Remote control 240 is coupled to and provides IR output to IR sensors or j-box IR transceivers 242. IR sensors or j-box IR transceivers 242 are coupled to IR input card 213. Remote control 240 is also coupled to TV manager 202.

Auxiliary hub 243 comprises audio hub 244 and standard hub 245. Audio hub 244 is coupled to single-gang keypad with LCD and microphone 246 and to single-gang menu keypad with LCD and microphone 247. Audio hub 244 receives audio input signals derived from these microphones. Audio hub 244 is coupled to and provides these audio signals to audio matrix 235. Preamplifiers are provided to amplify the audio signals derived from the microphones. Standard hub 245 is coupled to audio hub 244 and provides additional communication capability for other devices that have the ability to be coupled to a network.

One embodiment of the present invention may be used with a network that complies with the EIA-485 electrical standard, which specifies balanced drivers and receivers. The EIA-485 standard specifies a bi-directional (half duplex), multipoint interface. Multipoint (party line) configurations are possible since the EIA-485 standard supports multiple driver operation. Multiple balanced drivers, multiple balanced receivers, and/or multiple balanced transceivers may be used to form a terminated, balanced network. The EIA-485 standard supports high data rates (e.g., 10 Mbps) and long cable lengths (e.g., 4000 feet).

One embodiment of the invention provides a link state, which allows a network device to flash a light or provide some other indication to identify itself. A device can be in one of three link states. These states are unlinked (state 0), identification mode (state 2), and ready (state 4). In identification mode, a device flashes a LED or provides some other indication and continues to do so until the state is changed. In unlinked mode, the device broadcasts information periodically, and the device does not respond to application messages. In ready mode, the device responds to application messages and performs its usual functions.

One embodiment of the present invention can be used to create a network based on a master-slave type relationship where a master controller handles interfacing with each node. The master controller handles all drivers, version control and binding of parameters. This simplifies the installation process to involve merely attaching a software device to its corresponding hardware device.

INSTALLATION OF NODES

Discovering Nodes

According to one embodiment, upon power up, each network device, or node, starts up in an unlinked state in which the node does not send or respond to application messages and in which the node broadcasts a version message every two seconds, for example using a first type of network management message. This type of message contains a physical ID of the device, as well as the device type, manufacturer ID, hardware and firmware version numbers, as well as card frame and card slot information (if a the device is a card) and a subnet/node number, if one has previously been assigned. When the master controller receives this message, it performs a number of steps.

The network devices in this embodiment are configured to respond to all applicable management messages at any time. If there is a conflict between the subnet/node number of this device and another device, the master sends management messages to one of the conflicting devices to reconfigure the subnet/node address. In one embodiment, the messages are Echelon compatible. If necessary, the master can get handshake information, and a text description of the device before proceeding.

Once a node has been designated with a unique subnet and node address, the master controller sends a management message, referred to as a "link state" message, to the node. This type of message puts the designated node in a normal link state, thereby terminating the transmission of version messages by the network node that occur when the node is in the unlinked state.

This link state message also registers the master's address with the device, so now all messages directed to the master from the node are properly addressed to the master. Receipt of this link state message by the node confirms that a master has received the initial version message and that the wiring between the node and the master is good. Receipt of this type of message causes the node to indicate that the wiring is good, either by LED indication or by a text message displayed on an LCD screen. The node also begins sending and responding to application messages at this point.

Attaching Nodes

After the node has received a link state message from the master, the node is present on the network and known by the master, but may or may not be attached to a corresponding software object that represents and controls it. For example, the node may actually be a kitchen sink dimmer. There may also exist a software object that is intended to control the kitchen sink dimmer, but the software has no way to distinguish the kitchen sink dimmer from the other known dimmers on the network if a binding does not exist between a software object and the hardware device. To be effectively controlled by the master, each software object must first be bound, or attached, to a corresponding hardware object.

One embodiment of the invention provides two techniques for attaching nodes to software objects that have been linked to the master. One technique is accomplished by detecting the pressing of a button on an eligible node. The process involves a number of steps. First, the attachment process is started by selecting a device that is known to the master for attachment using a personal computer linked to the master. This selection may be performed by executing a wizard program on the computer to sequentially guide a user through the steps of the attachment process for attachment of all desired devices. Alternatively, a particular device may be selected for attachment and the attachment process performed for that particular device only.

Regardless of whether a wizard program is used or a particular device is specified, a device is selected for attachment from the list of devices known to the master, for example the kitchen sink dimmer. Upon selection of the device, the master sends a link state management message to all eligible devices of compatible type (e.g., dimmers) and changes the link state to an identification mode. This change activates an indicator such as a flashing LED on each eligible device, making it easier to locate the particular device desired to be bound.

When the desired device is physically located, the button on the device is pressed a predetermined number of times (e.g., four times in one embodiment) to indicate to the controller or computer that this is the desired device (e.g., kitchen sink dimmer). The controller or computer then binds the hardware devices to the software object. The controller or computer also sends a link state message to the nonselected devices of the designated type that returns them to the normal link state.

If there are more devices to attach, the process is repeated with the remaining unattached devices. If, for example, dimmers are being attached to their representative software objects, and all but five dimmers have been attached, only the five remaining unattached dimmers are placed into the identification mode and caused to flash their LEDs. If only one software object and one hardware object remain unattached, the controller or computer can automatically detect this situation and bind these objects together, if desired.

A similar process is used to identify devices without buttons. The attachment process is started in the same manner previously described. The master determines which devices are eligible to be attached. One of the eligible devices is set to the link state using an appropriate management message, and the indicator of that device is activated, providing visual indication of the device.

The user is prompted by the master controller (which may be, for example, the computer) to determine if the device whose indicator has been activated is the desired device. If the device whose indicator has been activated is not the desired device, the next eligible device is automatically determined. The indicator of the device whose indicator had been activated is now deactivated, and a message is sent to activate the indicator of the next eligible device. When the indicator of the desired device is activated, the master controller receives an acknowledgment from the user and the controller attaches the device to its representative software object.

The master keeps track of all devices, so the binding process need not occur more than once per installation. A node discovery process, however, is performed each time the master is started to confirm that all attached devices are on-line. Since all nodes are attached after the initial installation has been completed, no manual intervention is required, and the master can automatically become aware of any device failure.

Since the master controls the interaction of the master with each device, each node needs only enough intelligence to interact with the master. The master is provided with modules that correspond to each hardware device, and the information and control capabilities of a device are accessed by the master through the device's corresponding module. Consequently, the devices need not change to support new hardware when new hardware is added to the network. New devices can interact with old ones and old devices can control new ones, via the master, without necessitating changes in the system. The software modules can be upgraded easily, if desired.

Packet Structure

TABLE 1

| Byte | Description |
| --- | --- |
| Flags[1] | Message Flags |
| Length[L] | Message Length L = 1; Small packet, L = 2; Large packet |
| Packet Number[L] | Packet Number |
| Priority[1] | Message Priority |
| {E.A. Length}[1] | {Optional} Extended Address Length (Flags & 0 × 10) |
| {E.A. Type}[1] | Extended Address Type |
| {Ext. Address}[EAL-1] | Extended Address |

TABLE 1-continued

| Byte | Description |
| --- | --- |
| {System ID Length}[1] | {Optional} System ID Length (Flags & 0 × 20) |
| {System ID}[SIL] | System ID |
| {Partial Packet ID}[L] | {Optional} Partial Packet ID (Flags & 0 × 40) |
| {Part. Packet Offset}[4] | Partial Packet byte offset |
| Function code[1] | Function code |
| Function data[ ] | Data for this function |

Table 1 is a table describing the packet structure for data packets transmitted over a network according to one embodiment of the present invention. These data packets are used to transmit messages including management messages between the nodes and the master. In this embodiment, a data packet comprises flags data, length data, packet number data, priority data, extended address length data, extended address type data, extended address data, system identification (ID) length data, system ID data, partial packet ID data, partial packet offset data, function code data, and function data. The flags data comprise bits that serve as message flags.

The length data comprise one or more bytes that indicate the length (i.e., number of bytes) of the message being transmitted in the data packet. For example, one embodiment of the invention may use small packets having a length of no more than 256 bytes. The length data for such a packet may be represented by a single byte. Another embodiment of the invention may use large packets having a length of no more than 65536 bytes. The length data for such a packet may be represented by two bytes. Other embodiments may use different packets sizes and different length data representations.

The packet number data are used to assign a unique number to each packet transmitted to provide assurance that each device on the network correctly receives all of the packets transmitted in the correct order. If a packet is somehow lost during transmission, a gap in the sequence of packet number data indicates the absence of the lost packet. A request is then generated for re-transmission of the lost packet. The packet number data may also depend on the setting of the large packet flag of the flags byte. For example, in one embodiment, a one-byte packet number may be assigned to a small packet, while a two-byte packet number may be assigned to a large packet. The packet number is returned with an acknowledgment of the message unless packet streaming is active. If packet streaming is used, only the packet number of an out-of-order packet or of the last packet of a packet stream is returned with an acknowledgment.

The priority data comprise one byte indicative of a priority level assigned to the packet. The priority level is used to determine how and when a packet is to be processed. For example, a higher priority packet may be processed immediately, while a lower priority packet may be processed after a delay or after processing of any higher priority packets is completed. In one embodiment, a value of one represents highest priority, a value of 255 represents lowest priority, and a value of 128 represents normal priority.

The extended address length data, extended address type data, and extended address data are used to provide an extended addressing capability. The extended addressing capability ensures compatibility with networks that support large numbers of network nodes and thus extends the variety of networks with which the present invention may be used. The extended address length data comprise a byte that specifies the length of the extended address data and the extended address type data. The extended address type data comprise a byte that specifies the type of extended address data.

Different types of extended address data compatible with a variety of network types may be supported. The extended address data comprise a number of bytes of addressing information. The number of bytes is based on the extended address length data. Data relating to extended addressing may be omitted if not needed. A flag bit in the flags byte is used to specify whether the optional data relating to extended addressing is present in a packet or not.

The system ID length data are used to specify the length of the system ID data. The system ID data are used to uniquely identify the system with which a controller and devices are associated. Since the invention may be practiced with large networks comprising many nodes, many systems may be distributed across such networks. The ability to uniquely identify and specify a system avoids ambiguity among systems on a large network. System ID data may be omitted if not needed, for example if only one system is present on a network. A flag bit in the flags byte is used to specify whether or not the optional system ID data are present in a packet.

Support for partial packets is also provided. Partial packets are useful where it is desired to transmit a packet that is larger than the maximum packet size for a given network. Partial packets allow what would otherwise be an excessively large packet to be divided into smaller packets of acceptable size. Partial packet ID data is sequential packet numbering applied to packets of a multiple packet message. Partial packet byte offset data provides a byte offset value used to position data contained in a partial packet relative to data contained in other partial packets to allow reassembly of the original packet that was otherwise too large to transmit. A flag bit of the flags byte is used to specify whether or not a packet is a partial packet and contains partial packet ID data and partial packet byte offset data.

Function code data are used to identify a function to be performed by the system or one or more components thereof. The meaning of a numeric function number contained in the function code data may vary depending on the type of device to which the packet is directed. For example, function code data representing a numeric function number of one may refer to a different function to be performed on a lighting dimmer than on an IR transmitter or an audio amplifier. Function data are data used by the system or system components to perform the function specified by the function code data.

TABLE 2

| Definition of Flags bits: | |
| --- | --- |
| 0 × 01 | 0 = Application, 1 = Management message |
| 0 × 02 | 0 = To Device, 1 = To Master |
| 0 × 04 | 1 = packet acknowledgment, 0 = Unsolicited message |
| 0 × 08 | 1 = OOPS - Out of Order Packet Sent, resend |
| 0 × 10 | 1 = Extended addressing information is present. |
| 0 × 20 | 1 = System ID information is present. |
| 0 × 40 | 1 = Partial packet |
| 0 × 80 | 1 = Large packet (e.g., greater than 256 bytes long) |

Table 2 is a table defining the bits of the flag byte included in a data packet according to one embodiment of the present invention. The least significant bit (LSB), having a place value expressed in hexadecimal as 0x01, has a value of zero if the packet contains an application message and a value of one if the packet contains a management message. The bit having a place value expressed in hexadecimal as 0x02 has a value of zero if the packet is directed toward a device and a value of one if the packet is directed toward a master.

The bit having a place value expressed in hexadecimal as 0x04 has a value of zero if the packet contains an original unsolicited message not generated in response to another message and a value of one if the packet is transmitted as a packet acknowledgment or response. The bit having a place value expressed in hexadecimal as 0x08 has a value of one if a packet has been detected as being out of the normal packet order. This bit can be used to indicate that the packet should be resent.

The bit having a place value expressed in hexadecimal as 0x10 has a value of zero if extended addressing information is not present in the packet and a value of one if such information is present. The bit having a place value expressed in hexadecimal as 0x20 has a value of zero if system ID information is not present in the packet and a value of one if such information is present. The bit having a place value expressed in hexadecimal as 0x40 has a value of zero if the packet is not a partial packet and a value of one if the packet is a partial packet. The most significant bit (MSB) of the flags byte, having a place value expressed in hexadecimal as 0x80, is used to indicate the size of the packet. For example, if the packet size does not exceed a certain value, for example 256 bytes, the MSB has a value of zero. If the packet exceeds a certain size, the MSB has a value of one.

TABLE 3

Messages - Extended Address Packet Format

| Message data bytes | Description |
|---|---|
| E.A. Length[1] | Extended Address Length = 7 |
| E.A. Type[1] | Extended Address Type 0 x 01 = Echelon message |
| Neuron ID[6] | Neuron ID (NID = 000000: Broadcast) |

Table 3 is a table that describes characteristics of extended addressing information for one embodiment of the present invention. This embodiment provides compatibility with a variety of network types, including the previously-described Echelon system. The invention avoids the disadvantages of the Echelon system by providing compatibility with many types of networks and by avoiding the complicated configuration process required when the distributed control mode of the Echelon system is used.

Echelon-related communication parameters are handled by Echelon-based components in the master controller. To distinguish home automation messages from other messages a unique message code is used, for example a message code of 30. Message type data is also specified. For example, in one embodiment, a message employing an unbound type of addressing is defined as being of message type zero. A message directed to a subnet/node address is defined as being of message type one. A message directed to an Echelon-based device using its six-byte electronic serial number known as its "Neuron ID" is defined as being of message type two. A message broadcast to all nodes on a subnet is defined as being of message type three.

A message service or delivery method may also be specified. For example, in one embodiment of the invention, a message to be acknowledged by the recipient is transmitted by acknowledged message service, which is represented by message service data having a value of zero. A message that is not to be acknowledged by the recipient is transmitted by unacknowledged message service, which is represented by message service data having a value of one. A repeated message that is not be acknowledged is represented by message service data having a value of two. A message that is to be transmitted as a request and for which a response is expected is represented by message service data having a value of three. A destination subnet is a subnet to which a message is directed.

TABLE 4

Network Management Messages

| Message, data bytes | Description |
|---|---|
| 1 | Version |
| 2 | Network Heartbeat |
| Heartbeat Timing | Tenths of seconds between heartbeats |
| Month[1] | Current Date: Month 1–12 |
| Day[1] | Day 1–31 |
| Year[2] | Year |
| Hour[1] | Current Time: Hour 1–24 |
| Minute[1] | Minute |
| Second[1] | Seconds |
| Day of Week[1] | 0 = Mon, 1 = Tues, etc. |
| Outside Temp[1] | Outside Temperature (if available) |
| Text Data String[ ] | Date Text |
| 3 | Link State |
| Link State[1] | New Link State |
| Link Timer[1] | Frequency of Link action in tenths of seconds |
| Possible link states are listed below: | |
| 0 | Not Linked - Default Timer = 20 |
| 2 | Identify mode - Default Timer = 4 |
| 4 | Normal ready mode - Timer = 1 |
| 4 | ID Mode Button Press |
| 5 | Display Information |
| ASCII Text[ ] | Text string to display |
| Formatting information that may be included in the first byte of each line: | |
| Reverse | 255 (xFF) |
| Center Text (horizontal) | 254 (xFF) |
| Right Justify | 253 (xFD) |
| Center and Reverse | 252 (xFC) |
| Right Justify and reverse | 251 (xFB) |
| Normal | 250 (xFA) |
| 6 | Set System ID |
| ID Length[1] | System ID Length |
| System ID[ ] | System ID number |
| System Name[ ] | ASCII Text system name null terminated |
| 7 | Get System ID |
| 8 | Get Handshake Information |
| 9 | Text device description |
| 10 | Report error status |
| 11 | Transmit Parameters |
| Retry[1] | Number of retries per send 0–15 |
| TX timer[1] | Transmit timer 0–15 |

Table 4 is a table that describes several types of messages used for management of a network according to one embodiment of the invention. Such messages may originate from a network controller and be sent to devices on the network. A first type of network management message requests the version, device type, and addressing information from a device on the network.

A second type of network management message is sent periodically to indicate network integrity and to update date, time, temperature, and other information for each device. The information comprises general information that is not limited to one type of device. Date information is expressed as a month numbered 1–12, a day numbered 1–31, a year, and a day of the week numbered 0–6. Time information is expressed as an hour numbered 1–24, minutes, and seconds. The outside temperature is expressed as a signed quantity. Certain specific outside temperature values are used as instructions. For example, in one embodiment, a temperature value of zero is used to indicate that the outside temperature should not be displayed by the devices. No response is needed or expected for this second type of network management message.

Heartbeat timing information is provided with this second type of network management message to indicate to the devices when the next heartbeat should be expected. This information allows devices incorporating a "link light" to properly control the link light to indicate the integrity of a network link. If the next heartbeat is not received by the end of the period indicated, the device will have reduced confidence in the reliability of the network link and may extinguish the link light. The text data string may be used to display the date and time information in a textual format or may be used to display other information on devices that incorporate information displays.

A third type of network management message provides link state information used to set the link state of a device. Such a message comprises link state data that indicates a new link state and link timer data that indicates the frequency of link action expressed in tenths of seconds. Three link states are defined as follows: not linked, which is identified as link state 0 and which has default link timer data of 20; identification mode, which is identified as link state 2 and which has default link timer data of 4; and normal ready mode, which is identified as link state 4 and which has default link timer data of 1.

State 0 causes a device to broadcast a version message every two seconds until the link state is changed. State 0 is the initial state after reset. The device does not respond to application messages while in state 0. State 2 is used for identification mode and causes lights or other indicators to flash on the device, thereby aiding in identification of the device and in binding of the device to a corresponding software representation stored in the network controller. When a device is in state 4 (normal mode), the device may operate and send messages normally.

A fourth type of network management message represents an ID mode button press. This type of message originates at a network device and is directed to the network controller. This type of message is transmitted by a network device to the controller to indicate that a user has pressed a button on a device or otherwise selected a device to identify the device in the identification mode.

A fifth type of network management message is used to display information on a device capable of displaying information. Multiple lines of information are separated by null terminators, with a null being supplied for each line (IMS= 4). A null with no text clears the line. Formatting information can be included as the first byte of a line. The types of formatting include reverse (represented by 255), center text horizontally (represented by 254), right justify (represented by 253), center and reverse (represented by 252), right justify and reverse (represented by 251), and normal (represented by 250).

A sixth type of network management message is used to set the system ID of a system when multiple logical systems reside on the same physical network. A message of this type includes one byte of system ID length data that indicates the length of the system ID data, a system ID number that uniquely identifies a particular logical system, and a system name that provides a null-terminated ASCII text denomination for the system. When the ID length is set to zero, a system ID is not used; otherwise, messages include the system ID number.

A seventh type of network management message is used to request a device to report its system ID. This type of message is sent to a device by the network controller.

An eighth type of network management message is used to request detailed information from a device regarding the capabilities of that device. The information on device capabilities may be used by the network controller for network optimization.

A ninth type of network management message is used to request from a device a description of that device in textual form. This feature may be used to obtain and display information about a device on a network even if no device-specific software driver has been provided for that device.

A tenth type of network management message is used to request the current error status from a device. This message may be sent from a network controller to a device on the network.

An eleventh type of network management message is used to adjust the transmission parameters of a device. The number of retries to be attempted during message transmission may be specified over a given range, for example 0–15. The duration of a transmit timer that provides timing information used to determine the time at which a re-transmission will be attempted may also be specified over a given range, for example 0–15. The number of retries to be attempted may be transmitted using one byte of the message, and the duration of the transmit timer may be transmitted using another byte of the message.

TABLE 5

Network Management Response Messages

| Message, data bytes | Description |
| --- | --- |
| 1 | Version |
| Physical Type[2] | Network and transceiver type |
| Manufacturer ID[2] | Manufacturer Identification number |
| Device ID[2] | Device Identification number |
| Hardware Version[2] | Hardware revision number |
| Firmware Version[2] | Firmware version number |
| CardFrame/Slot[2] | Cardframe and slot number (cards only, 0 = not a card) |
| Address[6+] | Unique Address of the requested node (Neuron ID) |
| Physical Type Table: | |
| 0 × 0101 | Echelon device with 491 transceiver @ 625 Kbps. |
| 0 × 0201 | Ethernet device with 10-base T transceiver @ 10 Mbps. |
| 2 | Network Heartbeat |
| No response. | |
| 3 | Link State |
| Acknowledge only. | |
| 4 | ID Mode button press |
| 5 | Display Information |
| Acknowledge only. | |
| 6 | Set System ID |
| 7 | Get System ID |
| ID Length[1] | System ID Length |
| System ID[ ] | System ID number |
| System Name[ ] | ASCII text system name null terminated |
| 8 | Get Handshake information |
| Flags[1] | Communication flags |
| Max packets[2] | Maximum number of packet buffers |
| Max buffer bytes[4] | Total bytes in buffer for packets |
| Definition of Flags bits: | |
| 0 × 01 | Management message |
| 0 × 02 | Master - can control other devices on the network |
| 0 × 04 | Supports NOPs (packet acknowledgment) |
| 0 × 08 | Supports packet streaming (Out of Order Packets) |
| 0 × 10 | Extended addressing information. (Can Route/Bridge) |
| 0 × 20 | System ID (Can support multiple systems on one network) |
| 0 × 40 | Supports partial packets |
| 0 × 80 | Supports Large packets (greater than 256 bytes long) |
| 9 | Text device description |
| Device Name[ ] | ASCII text device name or model number |

This is an ASCII text device description, null terminated. This may be

TABLE 5-continued

Network Management Response Messages

| Message, data bytes | Description |
| --- | --- |
| | useful for displaying new devices even if the software has no associated driver. |
| 10 | Device Error |
| Severity[1] | Error severity |
| Error Text[ ] | ASCII Text error message null terminated |
| | Severity can be any number from 0–255. 0 means the device is fully functional (device recovered), 255 is really bad. The error message is sent as ASCII text. |
| 11 | Transmit Parameters |
| | Acknowledge only. |

Table 5 is a table that provides examples of network management response messages according to one embodiment of the invention. Such a message may be sent from a device on a network to a network controller in response to a network management message.

A first type of network management response is sent in response to the first type of network management message and provides information about the device sending the response. The information provided relates to the version of the device and includes information about the physical type of the device, manufacturer ID data, device ID data, hardware version data, firmware version data, cardframe and slot number data for cards located in a cardframe, and address data.

The physical type data include two or more bytes of data identifying the network medium and transceiver type, which simplifies decoding of the address. Examples of possible physical types include an Echelon-compatible device with a MAX491CSD transceiver operating at 625 kilobits/second (Kbps), identified in hexadecimal as 0x0101, and an ethernet-compatible device with a 10Base-T transceiver operating at 10 megabits/second (Mbps).

The manufacturer ID data include two or more bytes of data that provide a manufacturer identification number to uniquely identify the manufacturer of the device. The device ID data include two or more bytes of data that provide a device identification number to uniquely identify the device. The device identification number may be assigned by the manufacturer of the device. The hardware version data include two or more bytes of data that represent a hardware revision number. The firmware version data include two or more bytes of data that represent a firmware version number.

Cardframe and slot data include two or more bytes of data that identify a cardframe and slot number in which a card is located. For devices that are not a card, this information may be left blank or replaced with a known value, for example, zero. The address data includes six or more bytes of data specifying a unique network address of the device, for example the "Neuron ID" electronic serial number of an Echelon-compatible device or the pre-programmed ethernet address of an ethernet-compatible device.

No response is needed or expected from a device after a network management message of the second type, known as a network heartbeat, is transmitted by the network controller. An acknowledgment may be transmitted in response to a network management message of the third type, known as a link state message. A fourth type of network management response is transmitted in response to the fourth type of network management message. This fourth type of response indicates that a button was pressed on a device while the device was in the identification mode.

An acknowledgment may be transmitted in response to the fifth type of network management message, which provides for the display of information on devices capable of displaying information. No response is needed or expected after the transmission of a network management message of the sixth type, relating to setting the system ID.

A seventh type of network management response is sent in response to the seventh type of network management message, which requests that a device report its system ID. These messages and responses are used when multiple logical systems reside on the same physical network. The seventh type of network management response comprises system ID length data, system ID data, and a system name.

The system ID length data includes one byte that specifies the length of the system ID data and system name that will be transmitted. When the system ID length is set to zero, the system ID is not specified. The system ID data includes the system ID number of the system to which the device is assigned. The system name is a null-terminated ASCII text system name assigned to the system. The present invention may be practiced with devices that support multiple systems, as well as those that do not, such as some Echelon-compatible devices.

An eighth type of network management response is sent in response to the eighth type of network management message. The eighth type of response provides detailed information on the device communication capabilities, referred to as handshake information, in response to the eighth type of message requesting detailed information about a device on the network. This type of response includes a communication flags byte. Flag bits contained in this flags byte define the ability of the device to handle advanced networking features.

The LSB of the flags byte, having a hexadecimal place value of 0x01, specifies whether the transmission relates to a management message, and, since it does, has a value of one. The flag bit having a hexadecimal place value of 0x02 specifies whether the device is a master that can control other devices on the network. The flag bit having a hexadecimal place value of 0x04 specifies whether the device supports packet acknowledgment (NOPs). For devices that support acknowledgment, this bit is set to one.

The flag bit having the hexadecimal place value of 0x08 specifies whether the device supports packet streaming (out of order packets). The flag bit having the hexadecimal place value of 0x10 specifies whether the device supports extended addressing information (e.g., whether the device can route packets to another network or bridge packets between networks).

The flag bit having the hexadecimal place value of 0x20 specifies whether a system supports designation of system IDs and can support multiple logical systems on a single physical network. The flag bit having the hexadecimal place value of 0x40 specifies whether a system supports partial packets, allowing packets that would otherwise be too large to be transmitted as multiple packets. The flag bit having the hexadecimal place value of 0x80 specifies whether a device supports large packets (e.g., packets greater than 256 bytes long).

This eighth type of response also includes maximum packets data, maximum size data, and maximum buffer bytes data. The maximum packets data comprise two or more bytes specifying the maximum number of packets the device buffers can hold simultaneously. The maximum size data specify the maximum packet length the device can hold. The maximum buffer bytes data comprise four or more bytes specifying the total size (in bytes) of buffer space available in the device for packets.

A ninth type of network management response is sent in response to the ninth type of network management message, which is used to request a text description of a device. This type of response provides a null-terminated ASCII text description of the device, which may be useful for obtaining and displaying device information even if a device-specific software driver has not been provided for the specified device.

A tenth type of network management response is sent in response to the tenth type of network management message, which requests the error status of a device. This type of response includes error severity data and error text data. The error severity data comprises a byte specifying error severity on a scale from 0–255. Zero refers to a device having a fully functional status, while 255 refers to a device experiencing an extremely severe error. The error text data comprises a null-terminated ASCII text error message describing the error occurring at the device.

An acknowledgment may be sent in response to the eleventh type of network management message, which sets the transmit parameters of a device.

TABLE 6

Example Device Messages - Audio Amplifier

| Message, data bytes | Description |
| --- | --- |
| 1 | Mute |
| Mute[1] | Mute bit-field |
| 2 | Set Volume |
| Channel[1] | Output channel |
| Volume[1] | New Volume level |
| 3 | Get Settings |
| 4 | Save Volume Settings |

Table 6 is a table of example device messages. These messages allow a network controller to control a specific type of device, in this example an audio amplifier. The first type of device message is used to mute channels in the audio amplifier. The mute message comprises a byte containing the mute bit field. The mute bit field allows control of muting for eight channels with a single byte. The LSB of the byte controls muting of channel 1, with other bits controlling muting of other channels up to channel 8, the muting of which is controlled by the MSB of the byte. A bit is set to one to provide normal audio and to zero to mute the audio for a channel.

A second type of device message is used to set the volume for a specified output channel. The message comprises an output channel designation and a new volume level designation. Output channel designations 5–12 are used to set output channels 1–8 individually. Output channel designations 1–4 are used to set output channels 1–8 as four stereo channel pairs. Output channel designation zero is used to set all of channels 1–8 without the need for separate messages for each channel. When power is applied to the audio amplifier, the audio amplifier sets all channels to zero volume (maximum attenuation). When the volume levels are adjusted, the network controller or some other control device saves the volume levels and resets the audio amplifier to these levels after power has been restored.

A third type of device message is used to get setting values from the audio amplifier. This type of message causes the audio amplifier to return all current settings, including the mute status and volume level settings for all channels.

A fourth type of device message is used to save volume settings. This type of message causes the audio amplifier to save current volume levels to non-volatile memory, for example electrically-erasable programmable read-only memory (EEPROM).

TABLE 7

Example Device Responses - Audio Amplifier

| Message, data bytes | Description |
| --- | --- |
| 1–4 | Current Settings |
| Mute[1] | Mute bit-field |
| Volume[8] | Volume settings for all channels. |

Table 7 is a table of example device responses. These messages are sent by a specific type of device, in this example an audio amplifier, in response to device messages directed to that device. The audio amplifier is configured to transmit a response to all device messages directed to it that returns the current settings of the audio amplifier. This response is also transmitted in response to changes in settings caused by manipulation of switches or knobs on the audio amplifier in addition to device messages received by the audio amplifier over the network. The settings returned include the mute status of all channels and the volume settings for all channels.

TABLE 8

Example Device Messages - Button Switch

| Message, data bytes | Description |
| --- | --- |
| 1 | Set LEDs |
| LED[1] | LED light level |
| 2 | Get State |
| 4 | Attach/Unattach Switch |
| Attach | Attachment state of button |
| LED[1] | LED light level if detaching button |
| 5 | LED On/Off state brightness |
| OFF level[1] | Switch OFF LED brightness |
| ON level[1] | Switch ON LED brightness |

Table 8 is a table of example device messages for a button switch. One type of message used to control the button switch is message type one, which sets the status of an LED indicator on the switch assembly. This type of message includes one byte of data to control the brightness of the LED. To turn the LED fully off, this byte is set to zero. The value of this byte may be increased to increase the brightness of the LED. The maximum value for this embodiment is 255, which turns the LED fully on. The manipulation of the button switch can also be used to control the status of the LED.

Another type of message used to control the button switch is message type two, which obtains the state of the switch from the switch. The first byte of data represents the first switch, off being represented as a zero and on being represented as a one.

Another type of message used to control the button switch is message type four, which is used to logically attach or detach the control button to or from the switching device itself. When the button is logically attached to the switch, manipulation of the button directly affects the flow of electrical current controlled by the switch. When the button is logically detached from the switch, button manipulation generates messages that are transmitted over the network. Responding messages may be sent over the network to control the flow of electrical current controlled by the switch, but manipulation of the button has no direct effect on the flow of electrical current controlled by the switch.

A zero is used to indicate that the button should be detached from the switch, while a one is used to indicate that the button should be attached to the switch. By default, the button is attached to the switch. Thus, even if network communication were impaired, the switch and the electrical load coupled to it could still be controlled by the button.

This type of device message also includes information to control the LED light level. This information is useful if the button is detached from the switch. When the button is attached to the switch, this information may be omitted since the switch assembly is capable of autonomously controlling the LED and switching device based on input received from the button.

Another type of message used to control the button switch is message type five, which sets the brightness levels to be used when the switch is in the off state and in the on state. This type of message includes one byte to provide a LED brightness level to be used when the switch is in the off state and one byte to provide a LED brightness level to be used when the switch is in the on state. These defined LED brightness levels are useful when the button is logically attached to the switch since these levels may be used to autonomously control the LED status without interaction with a network controller over a network.

TABLE 9

Example Device Responses - Button Switch

| Message data bytes | Description |
| --- | --- |
| 1–5 | Current State |
| 10 | Button Press |
| Keys[1] | Key state bit-field |
| LED[1] | LED output level |
| Switch[1] | Switch state |
| Attach[1] | Switch attachment state |
| OFF LED[1] | LED brightness when switch is off. |
| ON LED[1] | LED brightness when switch is on. |

Table 9 is a table of example device responses sent by a button switch in response to device messages directed to the button switch. The button switch is configured to transmit a response to all device messages directed to it, returning the current state of the button switch.

The button switch also generates a response to its button being pressed, designated as response ten. This response does not need be initiated by a message received from a network controller; rather, it may occur in response to the button being pressed or released. The response includes one byte of information relating to the key state bit field. The LSB of the keys byte relates to a first button. The response also includes one byte of LED information indicating an LED output level. The response includes one byte of switch information identifying the state of the switching device (e.g., open or closed). The response further includes one byte of attachment state information indicating whether or not the button is logically attached to the switch. The response further includes one byte indicating the LED brightness level to be used when the switch is off and one byte indicating the LED brightness level to be used when the switch is on.

Figure 3A:
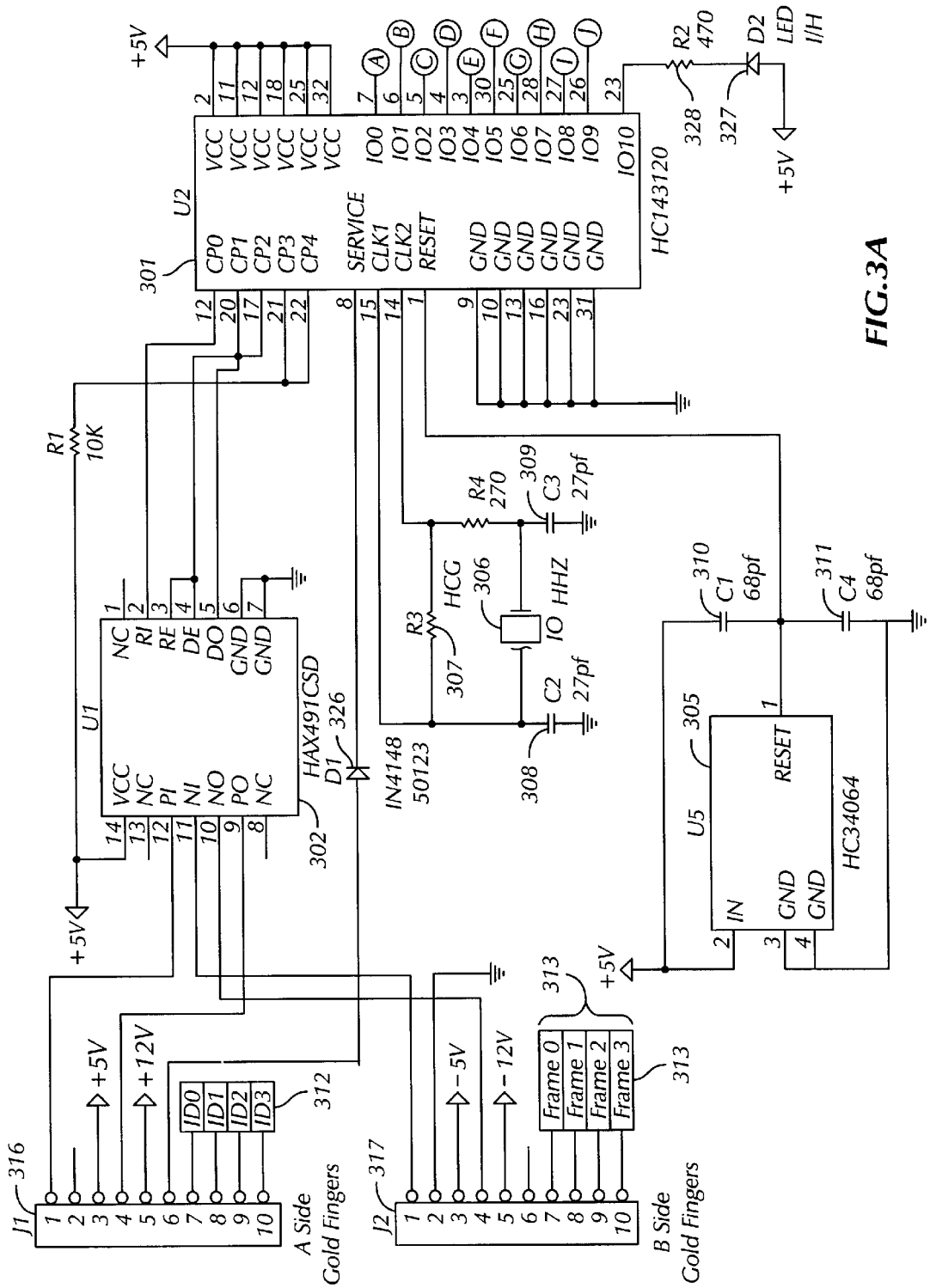
FIG. 3 is a schematic diagram illustrating an example of one type of network device according to one embodiment of the present invention.
Figure 3B:
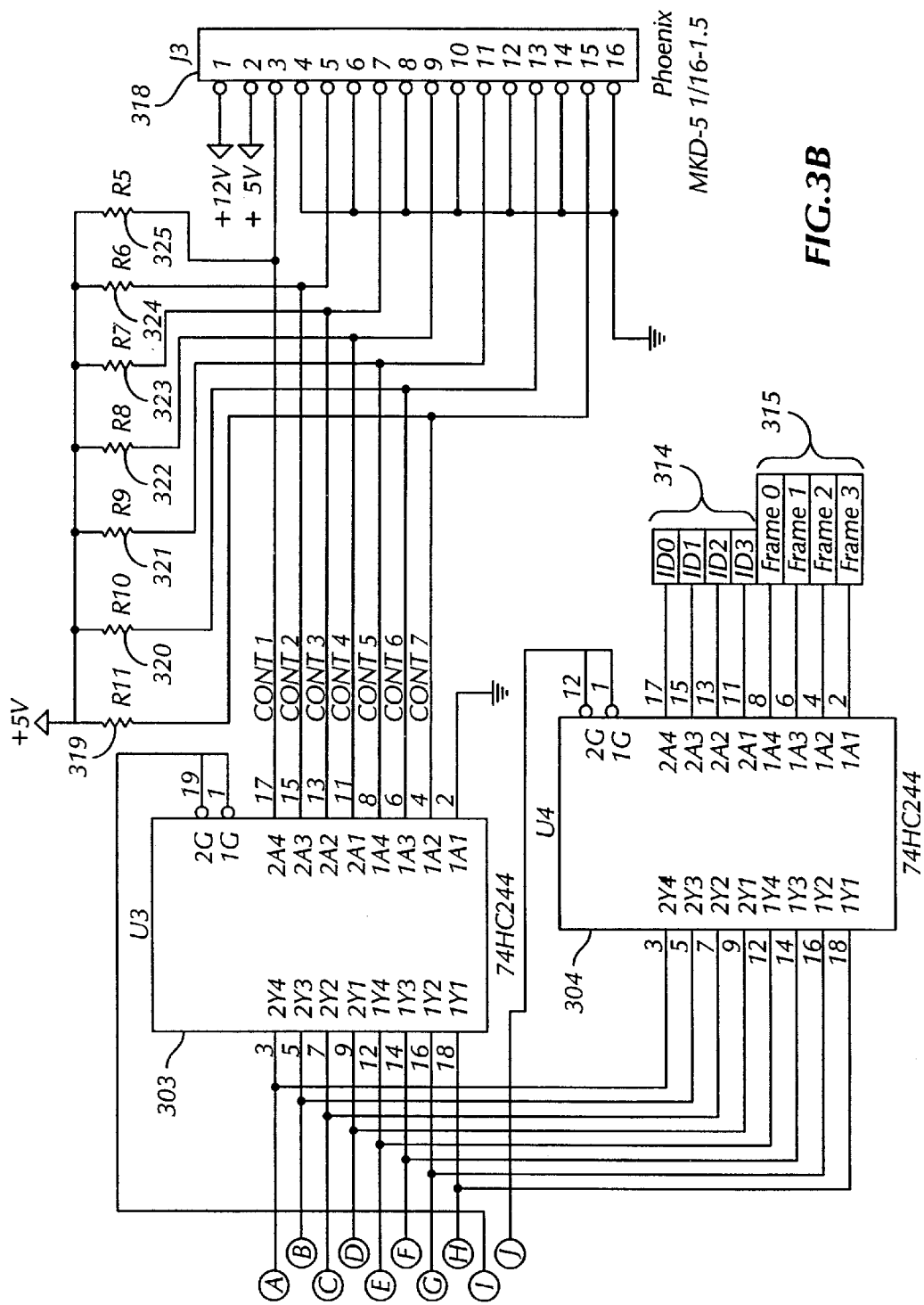

FIG. 3 is a schematic diagram illustrating an example of one type of network device according to one embodiment of the present invention. The device of FIG. 3 senses contact closures and transmits messages regarding the contact closures over a network. The device comprises Echelon-compatible device management circuit 301, network interface 302, latch 303, latch 304, reset circuit 305, crystal 306, resistor 307, capacitors 308, 309, 310, and 311, slot identification bus 312 and 314, frame identification bus 313 and 315, connectors 316, 317, and 318, resistors 319, 320, 321, 322, 323, 324, and 325, diode 326, light emitting diode 327, and resistor 328.

Echelon-compatible device management circuit 301 may be implemented using a circuit such as the Motorola MC143120 circuit. Network interface 302 may be implemented using a Maxim MAX491 interface circuit. Reset circuit 305 may be implemented using a circuit such as the Motorola 34064 reset circuit. Reset circuit 305 is coupled to capacitors 310 and 311 and provides a clean reset signal to Echelon-compatible device management circuit 301. Quartz crystal 306 is coupled to capacitors 308 and 309 and to resistor 307. These components provide a clock signal to Echelon-compatible device management circuit 301.

Connectors 316 and 317 provide connection of the device to a card cage. Connectors 316 and 317 pass power, network communication signals, and device identification information. Network signals received through connectors 316 and 317 are converted to a form recognized by Echelon-compatible device management circuit 301 by network interface 302. After conversion, the signals from network interface 302 are provided to Echelon-compatible device management circuit 301. Signals from Echelon-compatible device management circuit 301 to be transmitted over the network are converted to a form appropriate for network transmission by network interface 302. After conversion, these signals are transmitted from network interface 302 over the network through connectors 316 and 317.

External switch contacts are coupled to connector 318. Connector 318 is coupled to pull-up resistors 319 through 325 and to inputs of latch 303. The switch contacts coupled to connector 318 may remain in an open position or in a closed position. In the closed position, the resistively pulled-up inputs of latch 303 are coupled to ground, thereby changing their logic state. Echelon-compatible device management circuit 301 is coupled to latch 303 and can read the latch outputs of latch 303 to determine the logic state of the switch contacts coupled to connector 318.

Latch 304 is also coupled to inputs of Echelon-compatible device management circuit 301. The inputs of latch 304 are coupled to slot identification bus 314 and frame identification bus 315. Slot identification bus 314 is coupled to slot identification bus 312, which is coupled to connector 316. Frame identification bus 315 is coupled to frame identification bus 313 which is coupled to connector 317.

Slot identification buses 312 and 314 are provided with a digital representation of the slot number of the card on which the device is located. Frame identification buses 313 and 315 are provided with a digital representation of the card cage in which the device is located. The digital representations of the slot identification bus and the frame identification bus may be provided by any type of device capable of producing a unique digital output, for example, dual inline pin (DIP) switches. Using latch 304, Echelon-compatible device management circuit 301 can read the slot identification bus 314 and frame identification bus 315 to determine the slot and frame in which the device is located. This information may also be read by other devices in the card cage using connectors 316 and 317.

Diode 326 is coupled to connector 316 and to Echelon-compatible device management 301. Diode 326 is used to couple a signal between these components. Diode 327 is coupled to a supply voltage and to resistor 328. Resistor 328 is coupled to Echelon-compatible device management circuit 301. Light emitting diode 327 provides a visible indication that may be controlled by Echelon-compatible device management circuit 301.

Figure 4:
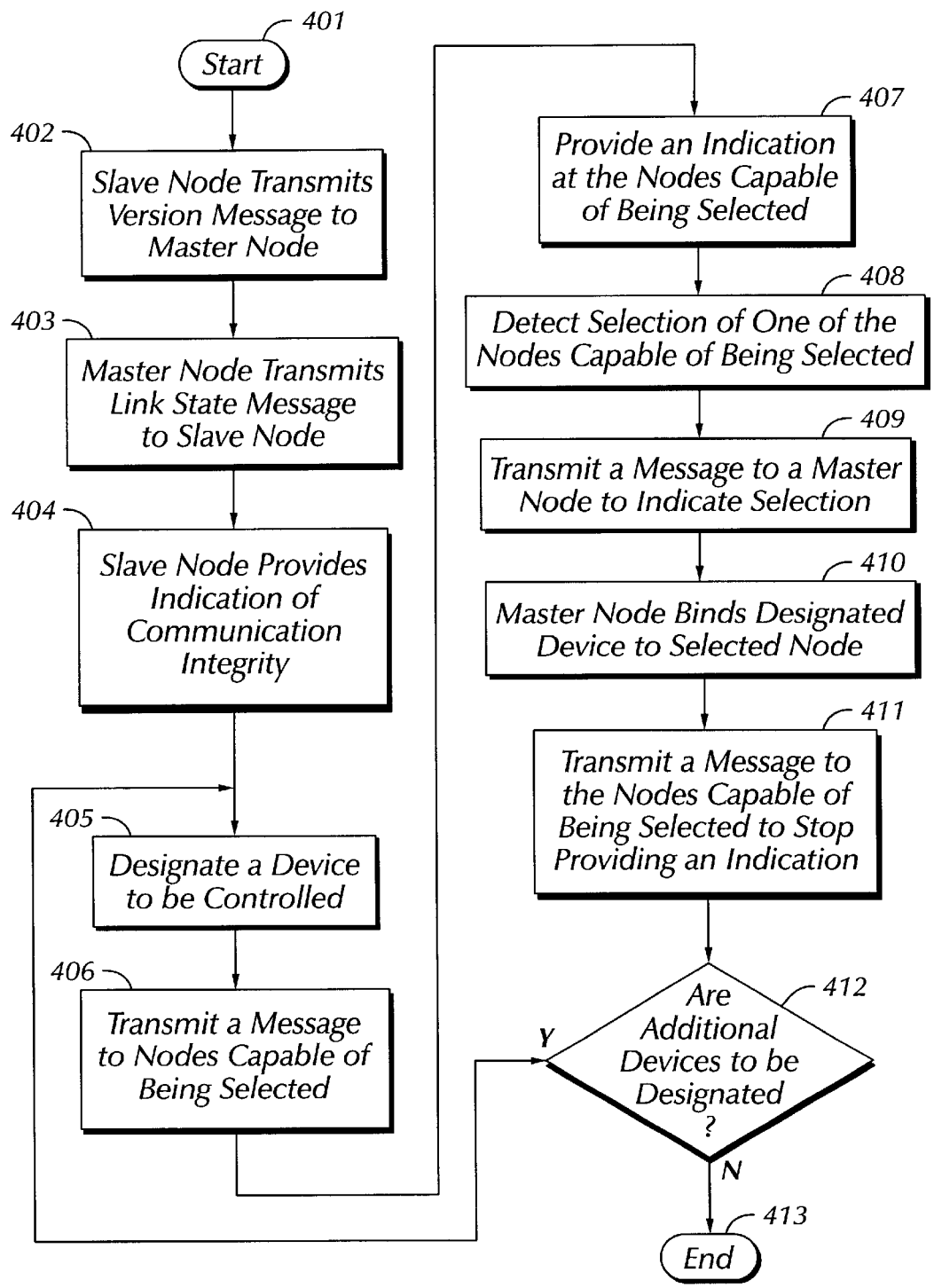
FIG. 4 is a flow diagram illustrating a process according to one embodiment of the invention.

FIG. 4 is a flow diagram illustrating a process according to one embodiment of the invention. The process begins in step 401 and continues to step 402. In step 402, a slave node transmits a version message to a master node. The version message indicates that the slave node is present on the network and identifies the type of device present at the slave node.

From step 402, the process continues in step 403. In step 403, the master node transmits a link state message to the slave node. The link state message provides confirmation that the master node has received the version message from the slave node and indicates the proper link state for the slave node.

From step 403, the process continues to step 404. In step 404, the slave node provides indication of communication integrity. For example, a slave node equipped with a display, such as an LCD, may display a message such as "wiring good" to indicate that the slave node has been wired to the network correctly and that effective communication over the network has been established. As another example, the display, which might normally display certain information, such as time and outside temperature, is blanked until a valid link state message has been received by the slave node. In such an example, a user would have confirmation of correct wiring and communication integrity when the normally displayed information appears on the display.

From step 404, the process continues in step 405. In step 405, a device is designated to be controlled by being bound to a software object corresponding to that device. This designation may be made, for example, at computer 102. When several devices are to be added to the network, the devices may be designated sequentially to simplify configuration of the network.

From step 405, the process continues in step 406, where a message is transmitted to nodes capable of being selected. This message may be transmitted, for example, from computer 102 to the nodes or from controller 101 to the nodes. The nodes may include various network devices, such as dimmer switches, button switches, or other devices physically connected to the network, but not yet logically configured to be active parts of the network.

From step 406, the process continues in step 407, where an indication is provided at the nodes capable of being selected. For example, the LED indicators on devices such as dimmer switches, button switches, or other devices so equipped may begin to flash. As another example, LCD's on devices such as keypads or other devices so equipped may provide an indication.

In one embodiment of the invention, the master node sends a message in step 407 to nodes that include displays, such as LCD's, to cause them to display an alphanumeric description of the software object that is to be attached to a hardware device. As an illustration, when a switch is to be bound to a software object referred to as "kitchen sink light," the master node may send a message to have capable devices display the description "kitchen sink light." A user then reads the description and can select from selectable devices to configure a switch to control a light over the kitchen sink, referred to as the "kitchen sink light." The master node can then bind the software object described as "kitchen sink light" to the selected switch.

From step 407, the process continues in step 408, where the selection of one of the nodes capable of being selected is detected. The selection of one of the nodes may be detected, for example, when an action, such as pressing a button associated with that node, occurs. For example, a user may see LED's flashing on several devices and press the button on the device that is intended to correspond to the designation specified in step 405. In such an embodiment, the selected device senses actuation of a switch by a user as part of its detection of selection.

As an illustration of one possible configuration scenario, a user may designate a "kitchen sink light" in step 405 to be the device to be controlled. A user may notice that, among possibly other devices with flashing LED's, a button switch located near a kitchen sink has a flashing LED. The user may decide to select that particular button switch to be bound to the software object having the designation "kitchen sink light." The user then performs an action, for example pressing that particular button switch, to indicate selection of that button switch.

One embodiment of the present invention provides an effective user interface by allowing a user to press the same switch during the configuration process that is used for normal operation of the switch. Thus, with this embodiment, the user does not have to be trained in the existence, location, and function of a special or hidden switch that is used only for a configuration process.

To avoid ambiguity, one embodiment of the invention requires the user to press the switch more than once, for example four times, to indicate selection of that device. In such an embodiment, the device senses multiple actuation of the switch by the user so as to detect selection of the device.

After the selected device has detected its selection in step 408, the device transmits a message to a master node to indicate selection in step 409. From step 409, the process continues in step 410. After receiving the message transmitted in step 409, the master node, which may be, for example, computer 102 or controller 101, binds the software object or designation specified in step 405 to the hardware object or node for which selection was detected in step 408. This binding may occur immediately after the master node receives the message transmitted in step 409 or at a later time, for example, after step 411.

From step 410, the process continues in step 411. In step 411, the master node transmits a message from to the nodes capable of being selected to cause them to stop providing an indication. In one embodiment of the invention, this message is transmitted to the same nodes to which the message of step 406 was transmitted and causes these nodes to stop providing the indication that was initiated in step 407.

From step 411, the process continues in step 412. In step 412, a decision is made as to whether additional devices are to be designated. If additional devices are to be designated, the process continues in step 405. If no additional devices are to be designated, the process continues in step 413. The process ends in step 413.

Figure 5:
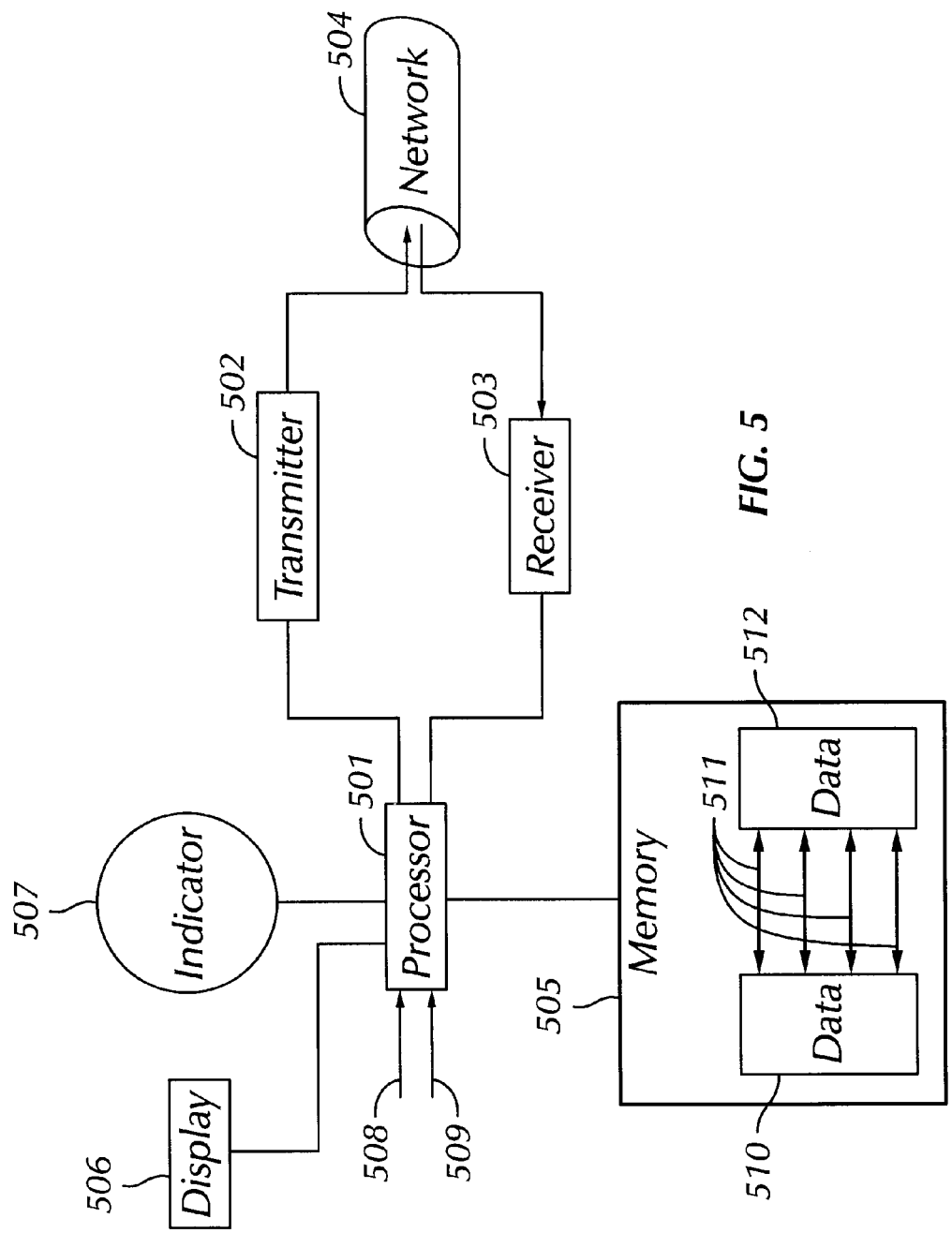
FIG. 5 is a block diagram illustrating one embodiment of a controller or master node according to the invention.

FIG. 5 is a block diagram illustrating one embodiment of a controller or master node according to the invention. Processor 501 is coupled to transmitter 502, receiver 503, memory 505, display 506, and indicator 507. Processor 501 also receives power input 508 and control input 509. Transmitter 502 is coupled to network 504. Receiver 503 is also coupled to network 504. Memory 505 comprises data 510, bindings 511, and data 512. Bindings 511 couple elements of data 510 with elements of data 512.

Figure 6:
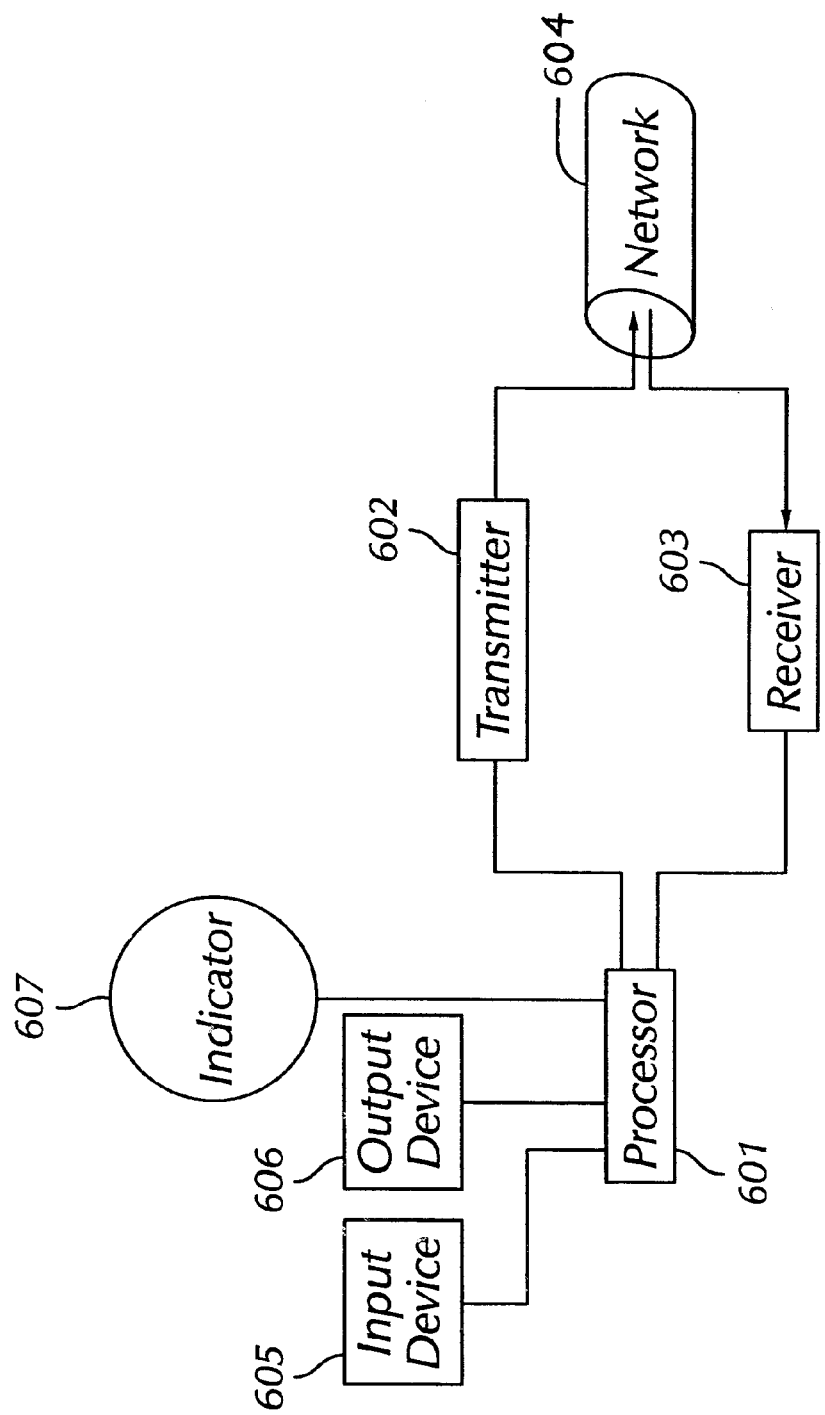
FIG. 6 is a block diagram illustrating one embodiment of a slave node or device according to the invention.

FIG. 6 is a block diagram illustrating one embodiment of a slave node or device according to the invention. Processor 601 is coupled to transmitter 602, receiver 603, input device 605, output device 606, and indicator 607. Transmitter 602 is coupled to network 604. Receiver 603 is also coupled to network 604.

Figure 7:
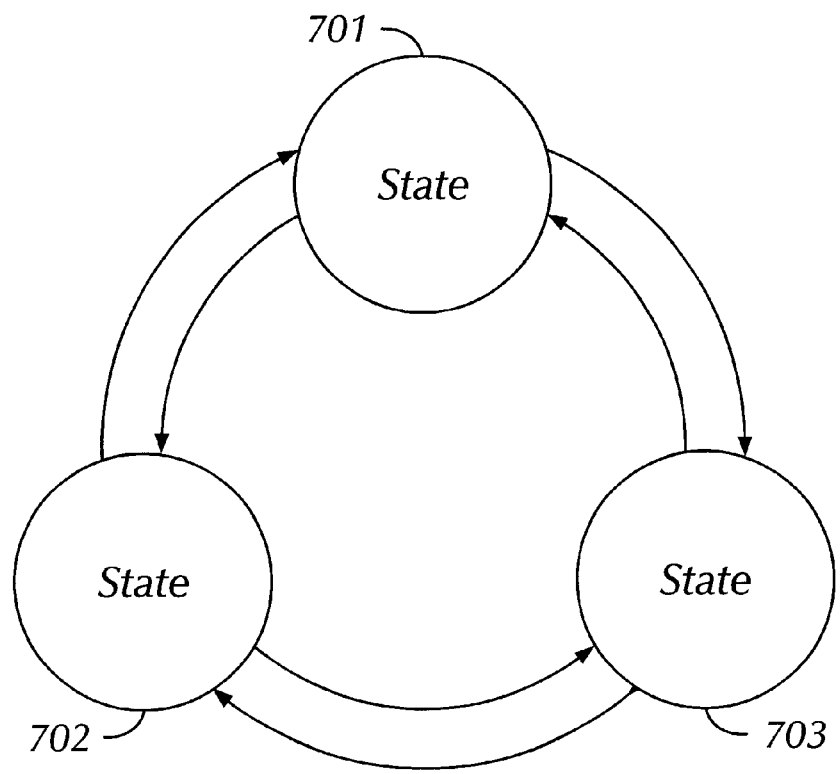
FIG. 7 is a state diagram illustrating three states in which one embodiment of a slave node or device may be.

FIG. 7 is a state diagram illustrating three states in which one embodiment of a slave node or device may be. State 701 represents a non-linked state. State 702 represents an identification mode state. State 703 represents a normal mode state.

Figure 8:
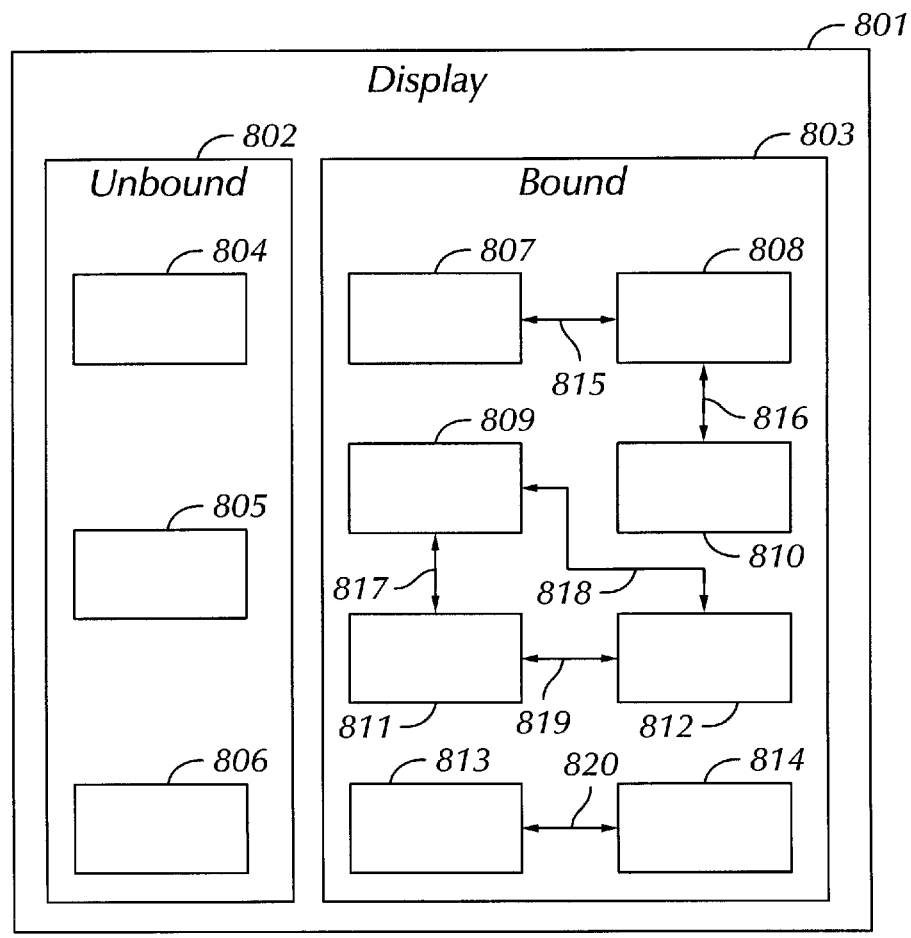
FIG. 8 is a diagram illustrating a display according to one embodiment of the invention.

FIG. 8 is a diagram illustrating a display according to one embodiment of the invention. Display 801 comprises unbound object display 802 and bound object display 803. Unbound object display 802 comprises unbound devices 804, 805, and 806. Bound object display comprises bound devices 807, 808, 809, 810, 811, 812, 813, and 814. Bound object 807 is coupled to bound object 808 by binding 815. Bound object 808 is coupled to bound object 810 by binding 816. Bound object 809 is coupled to bound object 811 by binding 817. Bound object 811 is coupled to bound object 812 by binding 819. Bound object 809 is coupled to bound object 812 by binding 818. Bound object 813 is coupled to bound object 814 by binding 820.

Figure 9:
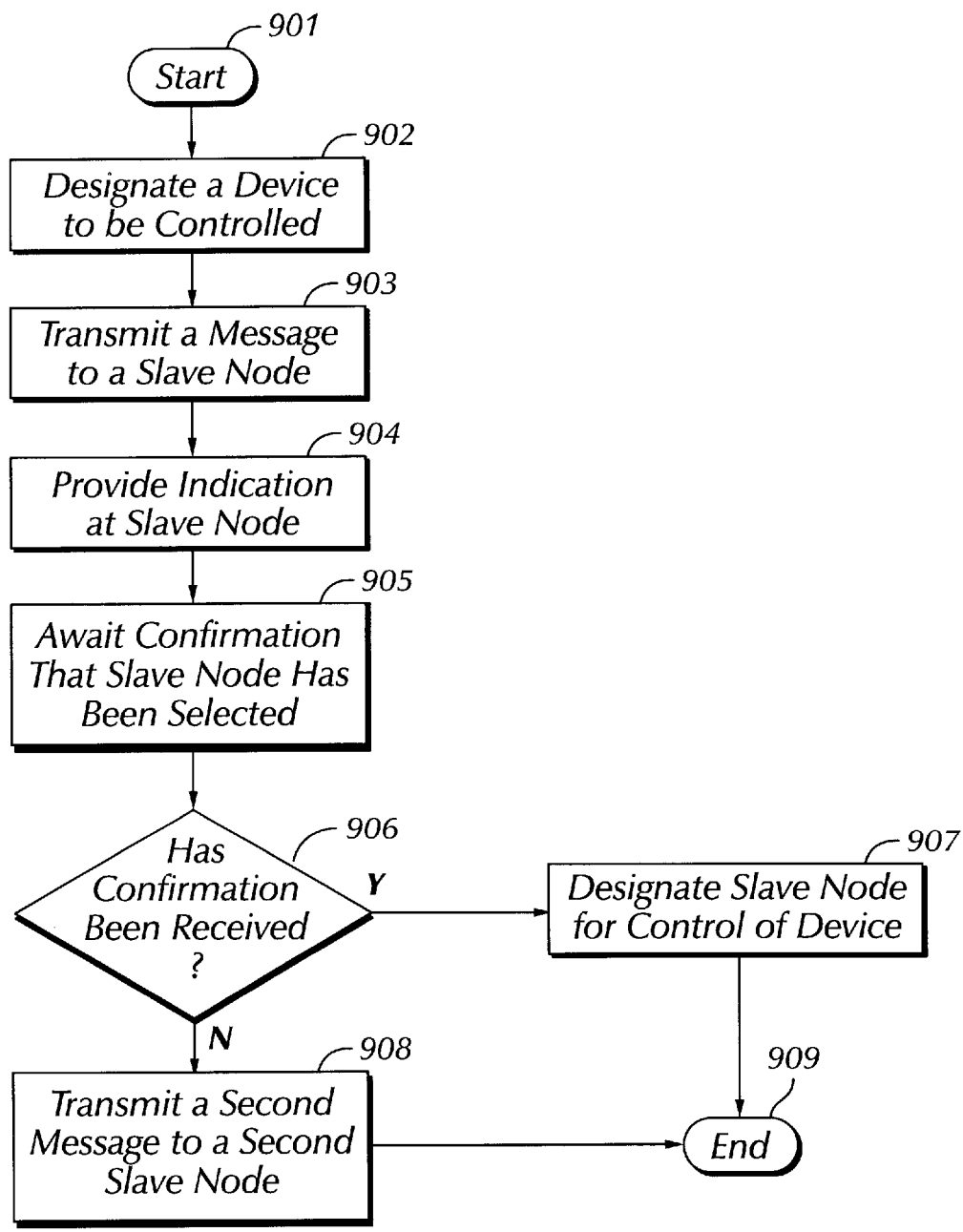
FIG. 9 is a flow diagram illustrating a method according to one embodiment of the invention.

FIG. 9 is a flow diagram illustrating a method according to one embodiment of the invention. The method begins in step 901. In step 902, a device to be controlled is designated. In step 903, a message is transmitted to a slave node. In step 904, an indication is provided at a slave node. In step 905, the process awaits confirmation that a slave node has been selected. In step 906, a decision is made as to whether or not confirmation has been received. If confirmation has been received, the process continues in step 907, where a slave node is designated for control of a device. If no confirmation has been received in step 906, the process continues in step 908, where a second message is transmitted to a second slave node. From either step 907 or step 908, the process ends in step 909.

Figure 10:
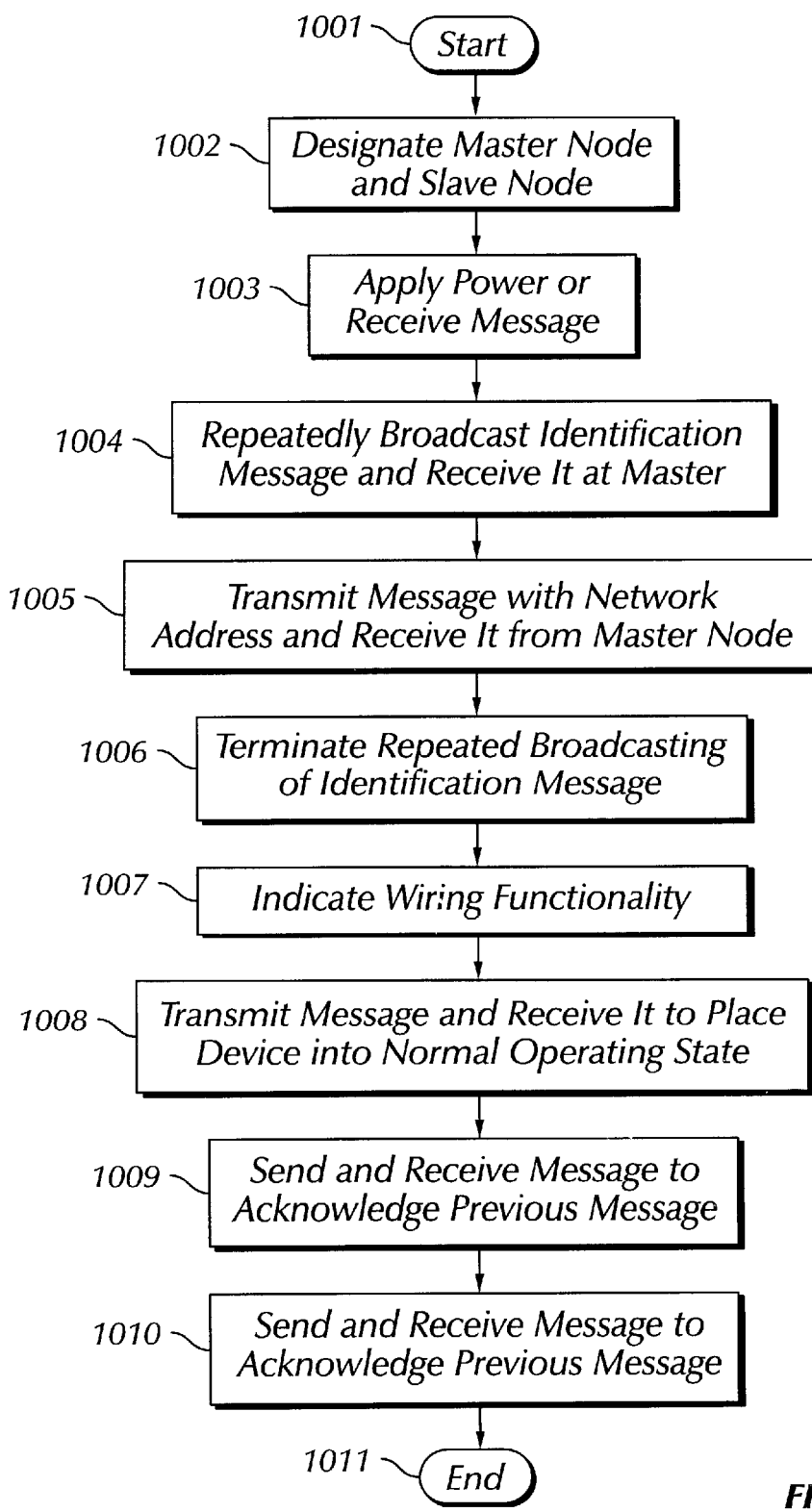
FIG. 10 is a flow diagram illustrating a method according to one embodiment of the invention.

FIG. 10 is a flow diagram illustrating a method according to one embodiment of the invention. The method begins in step 1001. In step 1002, a master node and slave nodes are designated. In step 1003, either power is applied to a slave node, or a slave node receives a message from the master node. In step 1004, an identification message is repeatedly broadcast by a slave node and received at the master node. In step 1005, a message containing a network address is transmitted by the master node and received by the slave node. In step 1006, the repeated broadcasting of an identification message is terminated. In step 1007, an indication of wiring functionality is provided. In step 1008, a message is transmitted and received to place the slave node or device into a normal operating state. In step 1009, a message is sent and received to acknowledge the message of step 1008. In step 1010, a message is sent and received to acknowledge the message of step 1009. In step 1011, the method ends.

What is claimed is:

1. A method for incorporating a new device into a network comprising the steps of:
   repeatedly sending a first message to a controller of said network in order to inform said controller that said new device is waiting to be added to said network;
   receiving from said controller a second message containing a network address that is to be used by said new device;
   receiving from said controller a third message that places said new device into a normal operating state;
   sending a fourth message to said controller to acknowledge receipt of said third message;
   receiving a fifth message from said controller to acknowledge receipt at said controller of said fourth message.

2. The method of claim 1 wherein said step of repeatedly sending said first message occurs in response to a step of:
   initially applying power to said new device.

3. The method of claim 1 wherein said step of repeatedly sending said first message occurs in response to a step of:
   receiving a sixth message from said controller.

4. The method of claim 1 further comprising the step of:
   indicating wiring functionality following said step of receiving from said controller said second message.

5. The method of claim 1 wherein said new device rejects application messages until said step of receiving from said controller said second message has occurred.

6. The method of claim 1 wherein said first message comprises addressing information.

7. The method of claim 1 wherein said first message comprises device type information.

8. The method of claim 1 wherein said first message comprises device version information.

9. The method of claim 1 wherein said first message comprises device manufacturer information.

10. The method of claim 1 wherein application messages received by said new device are processed by said new device when said new device is in said normal operating state but are ignored when said new device is not in said normal operating state.

11. The method of claim 1 wherein messages sent from said new device prior to said step of receiving from said controller said second message are broadcast network-wide, while said messages sent from said new device following said step of receiving from said controller said second message are addressed specifically to said controller.

12. A device capable of being incorporated into a network, said device comprising:
   a transmitter for periodically broadcasting a first identification message from said device;
   a processor coupled to said transmitter;
   a receiver coupled to said processor for receiving a second message transmitted from a master node on said network following said broadcasting of said first identification message, said transmitter terminating said broadcasting of said first identification message following said receiving of said second message.

13. The device of claim 12 wherein said transmitter begins periodically broadcasting said first identification message in response to an initial application of power to said device.

14. The method of claim 12 wherein said transmitter begins periodically broadcasting said first identification message in response to receiving at said receiver a third message from said master node.

15. The device of claim 12 further comprising:
   an indicator coupled to said processor for indicating functionality of wiring at said device after said receiver receives said second message.

16. The device of claim 12 wherein said device rejects application level messages until said receiver has received said second message.

17. The device of claim 12 wherein said first identification message comprises addressing information.

18. The device of claim 12 wherein said first identification-message comprises device type information.

19. The device of claim 12 wherein said first identification message comprises device version information.

20. The device of claim 12 wherein said first identification message comprises device manufacturer information.

21. The device of claim 12 wherein said device can be in one of a plurality of states, said plurality of states comprising:
   a first state in which all messages transmitted by said transmitter are broadcast and any application messages received by said receiver are ignored;
   a second state in which all of said messages transmitted by said transmitter are directed specifically to said master node and any of said application messages received by said receiver are ignored;

a third state in which all of said messages transmitted by said transmitter are directed specifically to said master node and any of said application messages received by said receiver are processed by said device.

22. A device capable of being incorporated into a network, said device comprising:
a transmitter for repeatedly sending a first message to a controller of a network in order to inform said controller that said device is waiting to be added to said network;
a processor coupled to said transmitter;
a receiver coupled to said processor for receiving from said controller a second message containing a network address that is to be used by said device and for receiving from said controller a third message that places said device into a normal operating state, said transmitter also for sending a fourth message to said controller to acknowledge receipt of said third message, said receiver also for receiving a fifth message from said controller to acknowledge receipt at said controller of said fourth message.

23. The device of claim 22 further comprising a power input coupled to said processor, wherein said transmitter repeatedly sends said first message to said controller in response to initial application of power to said power input.

24. The device of claim 22 wherein said said transmitter repeatedly sends said first message in response to receiving a sixth message from said controller.

25. The device of claim 22 further comprising:
a wiring functionality indicator coupled to said processor for indicating wiring functionality after said receiver has received from said controller said second message.

26. The device of claim 22 wherein said device rejects application messages until said receiver has received from said controller said second message.

27. The device of claim 22 wherein said first message comprises addressing information.

28. The device of claim 22 wherein said first message comprises device type information.

29. The device of claim 22 wherein said first message comprises device version information.

30. The device of claim 22 wherein said first message comprises device manufacturer information.

31. The device of claim 22 wherein said device processes application messages received by said receiver when said device is in said normal operating state but said device ignores application messages received by said receiver when said device is not in said normal operating state.

32. The device of claim 22 wherein said transmitter broadcasts messages network-wide prior to said receiver receiving from said controller said second message, while said transmitter sends messages addressed specifically to said controller following said receiver receiving from said controller said second message.

33. A method for controlling devices on a network comprising steps of:
designating at a master node of a network a device to be controlled;
providing in response to a first message received from said master node an indication at a plurality of slave nodes capable of being selected to control said device;
transmitting a second message from a selected one of said plurality of slave nodes to said master node to indicate selection of said selected one of said plurality of slave nodes to control said device;
sending a third message from said master node to said plurality of slave nodes to stop providing said indication;
sending a fourth message from said master node to said selected one of said plurality of slave nodes to display an indication of a second device to be designated to be controlled.

34. The method of claim 33 further comprising a step of:
detecting said selection of said selected one of said plurality of slave nodes by sensing activation of a switch at said selected one of said plurality of slave nodes.

35. The method of claim 34 wherein said step of sensing activation of said switch further comprises the step of:
sensing multiple activations of said switch.

36. The method of claim 33 further comprising a step of:
sending a fourth message from said master node to said selected one of said plurality of slave nodes to display an indication of a second device to be designated to be controlled.

37. Apparatus for controlling network devices comprising:
a plurality of slave nodes coupled to a network, said plurality of slave nodes comprising a first slave node;
a plurality of devices to be controlled coupled to said network, said plurality of devices comprising a first device;
a master node coupled to said network for managing said plurality of slave nodes and said plurality of devices to be controlled,
said master node comprising means for transmitting a first message to said plurality of slave nodes to cause said plurality of slave nodes to provide an indication at each of said plurality of slave nodes of being capable of being selected for control of said first device,
said first slave node comprising means for transmitting a second message to said master node to indicate that said first slave node has been selected,
said master node comprising means for transmitting a third message to said plurality of slave nodes to cause said plurality of slave nodes to stop providing an indication at each of said plurality of slave nodes of being capable of being selected; and
wherein said first slave node comprises means for transmitting a fourth message to said master node, said master node comprises means for transmitting a fifth message to said first slave node, and said first slave mode comprising means for providing a second indication of communication integrity between said first slave node and said master node.

38. Apparatus for controlling network devices comprising:
a plurality of slave nodes coupled to a network, said plurality of slave nodes comprising a first slave node;
a plurality of devices to be controlled coupled to said network, said plurality of devices comprising a first device;
a master node coupled to said network for managing said plurality of slave nodes and said plurality of devices to be controlled,
said master node comprising means for transmitting a first message to said plurality of slave nodes to cause said plurality of slave nodes to provide an indication at each of said plurality of slave nodes of being capable of being selected for control of said first device,
said first slave node comprising means for transmitting a second message to said master node to indicate that said first slave node has been selected, and said master node comprising means for transmitting a third message to said plurality of slave nodes to cause said plurality of slave nodes to stop providing an indication at each of said plurality of slave nodes of being capable of being selected;

wherein said master node comprises sending a fourth message to said first slave node to indicate to said user a second device to be designated to be controlled.

39. A program storage device readable by a machine, tangibly embodying a program of instructions executable by said machine to perform method steps for controlling devices on a network, said method steps comprising the steps of:

designating at a master node of a network a device to be controlled;

providing in response to a first message received from said master node an indication at a plurality of slave nodes capable of being selected to control said device;

transmitting a second message from a selected one of said plurality of slave nodes to said master node to indicate selection of said selected one of said plurality of slave nodes to control said device;

sending a third message from said master node to said plurality of slave nodes to stop providing said indication;

sending a fourth message from said master node to said selected one of said plurality of slave nodes to display an indication of a second device to be designated to be controlled.

40. A method for controlling devices on a network comprising steps of:

designating at a master node of a network a device to be controlled;

transmitting a first message to a first slave node capable of being selected to control said device;

providing a first indication at said first slave node in response to receiving said first message;

awaiting confirmation that said first slave node has been selected to control said device;

designating at said master node said first slave node for control of said device if said confirmation is received;

transmitting a second message to a second slave node capable of being selected to control said device if said confirmation is not received, wherein said first indication comprises an audible indication.

41. A method for controlling devices on a network comprising steps of:

designating at a master node of a network a device to be controlled;

transmitting a first message to a first slave node capable of being selected to control said device;

providing a first indication at said first slave node in response to receiving said first message;

awaiting confirmation that said first slave node has been selected to control said device;

designating at said master node said first slave node for control of said device if said confirmation is received;

transmitting a second message to a second slave node capable of being selected to control said device if said confirmation is not received, wherein said confirmation is provided via a user input device for said master node.

42. A program storage device readable by a machine, tangibly embodying a program of instructions executable by said machine to perform method steps for controlling devices on a network, said method steps comprising the steps of:

designating at a master node of a network a device to be controlled;

transmitting a first message to a first slave node capable of being selected to control said device;

providing a first indication at said first slave node in response to receiving said first message;

awaiting confirmation that said first slave node has been selected to control said device;

designating at said master node said first slave node for control of said device if said confirmation is received;

transmitting a second message to a second slave node capable of being selected to control said device if said confirmation is not received, wherein said first indication comprises an audible indication.

43. A program storage device readable by a machine, tangibly embodying a program of instructions executable by said machine to perform method steps for controlling devices on a network, said method steps comprising the steps of:

designating at a master node of a network a device to be controlled;

transmitting a first message to a first slave node capable of being selected to control said device;

providing a first indication at said first slave node in response to receiving said first message;

awaiting confirmation that said first slave node has been selected to control said device;

designating at said master node said first slave node for control of said device if said confirmation is received;

transmitting a second message to a second slave node capable of being selected to control said device if said confirmation is not received, wherein said confirmation is provided via a user input device for said master node.

44. A method for automatically detecting devices on a network comprising steps of:

designating a master node and a plurality of slave nodes, said plurality of slave nodes comprising a first slave node;

periodically broadcasting a first identification message from said first slave node;

receiving at said master node said first identification message;

transmitting from said master node to said first slave node a second message after said step of receiving at said master node said first identification message;

receiving at said first slave node said second message;

terminating said step of periodically broadcasting said first identification message after said step of receiving at said first slave node said second message;

indicating functionality of wiring at said first slave node after said step of receiving at said first slave node said second message.

45. A method for automatically detecting devices on a network comprising steps of:

designating a master node and a plurality of slave nodes, said plurality of slave nodes comprising a first slave node;

periodically broadcasting a first identification message from said first slave node;

receiving at said master node said first identification message;

transmitting from said master node to said first slave node a second message after said step of receiving at said master node said first identification message;

receiving at said first slave node said second message;

terminating said step of periodically broadcasting said first identification message after said step of receiving at said first slave node said second message;

wherein said first slave node rejects application level messages until said step of receiving at said first slave node said second message has occurred.

46. A method for automatically detecting devices on a network comprising steps of:

designating a master node and a plurality of slave nodes, said plurality of slave nodes comprising a first slave node;

periodically broadcasting a first identification message from said first slave node;

receiving at said master node said first identification message;

transmitting from said master node to said first slave node a second message after said step of receiving at said master node said first identification message;

receiving at said first slave node said second message;

terminating said step of periodically broadcasting said first identification message after said step of receiving at said first slave node said second message;

wherein said first identification message comprises device type information.

47. A method for automatically detecting devices on a network comprising steps of:

designating a master node and a plurality of slave nodes, said plurality of slave nodes comprising a first slave node;

periodically broadcasting a first identification message from said first slave node;

receiving at said master node said first identification message;

transmitting from said master node to said first slave node a second message after said step of receiving at said master node said first identification message;

receiving at said first slave node said second message;

terminating said step of periodically broadcasting said first identification message after said step of receiving at said first slave node said second message;

wherein said first identification message comprises device version information.

48. A method for automatically detecting devices on a network comprising steps of:

designating a master node and a plurality of slave nodes, said plurality of slave nodes comprising a first slave node;

periodically broadcasting a first identification message from said first slave node;

receiving at said master node said first identification message;

transmitting from said master node to said first slave node a second message after said step of receiving at said master node said first identification message;

receiving at said first slave node said second message;

terminating said step of periodically broadcasting said first identification message after said step of receiving at said first slave node said second message;

wherein said first identification message comprises device manufacturer information.

49. A method for automatically detecting devices on a network comprising steps of:

designating a master node and a plurality of slave nodes, said plurality of slave nodes comprising a first slave node;

periodically broadcasting a first identification message from said first slave node;

receiving at said master node said first identification message;

transmitting from said master node to said first slave node a second message after said step of receiving at said master node said first identification message;

receiving at said first slave node said second message;

terminating said step of periodically broadcasting said first identification message after said step of receiving at said first slave node said second message;

wherein said first slave node can be in one of a plurality of states, said plurality of states comprising:

a first state in which all messages transmitted by said first slave node are broadcast and any application messages received by said first slave node are ignored;

a second state in which all of said messages transmitted by said first slave node are directed specifically to said master node and any of said application messages received by said first slave node are ignored;

a third state in which all of said messages transmitted by said first slave node are directed specifically to said master node and any of said application messages received by said first slave node are processed by said first slave node.

50. A network controller coupled to a network comprising:

memory for storing data representative of capabilities of each of a plurality of devices coupled to said network, said plurality of devices comprising a first device and a second device;

a processor coupled to said memory for establishing bindings between said data of said first device and said data of said second device;

a receiver coupled to said processor for receiving incoming signals from said first device, said processor modifying said data in response to said incoming signals, wherein said incoming signals are representative of a state of said first device;

a transmitter coupled to said processor for transmitting outgoing signals to said second device in response to said data modified by said processor.

51. A network controller coupled to a network comprising:

memory for storing data representative of capabilities of each of a plurality of devices coupled to said network, said plurality of devices comprising a first device and a second device;

a processor coupled to said memory for establishing bindings between said data of said first device and said data of said second device;

a receiver coupled to said processor for receiving incoming signals from said first device, said processor modifying said data in response to said incoming signals;

a transmitter coupled to said processor for transmitting outgoing signals to said second device in response to said data modified by said processor, wherein said outgoing signals control a state of said second device.

52. A network controller coupled to a network comprising:

memory for storing data representative of capabilities of each of a plurality of devices coupled to said network, said plurality of devices comprising a first device and a second device;

a processor coupled to said memory for establishing bindings between said data of said first device and said data of said second device;

a receiver coupled to said processor for receiving incoming signals from said first device, said processor modifying said data in response to said incoming signals;

a transmitter coupled to said processor for transmitting outgoing signals to said second device in response to said data modified by said processor;

a display coupled to said processor for graphically displaying said data.

53. The network controller of claim 52 wherein said data are graphically displayed with unbound data segregated from bound data.

54. The network controller of claim 53 wherein said bindings are graphically displayed for said bound data.

55. The network controller of claim 54 wherein said unbound data may be graphically manipulated to initiate establishment of said bindings.

* * * * *